US010239350B2

(12) United States Patent
Skarie

(10) Patent No.: US 10,239,350 B2
(45) Date of Patent: Mar. 26, 2019

(54) TRACTION MEDIA AND TRACTION ENHANCING SYSTEMS FOR DISPENSING SUCH TRACTION MEDIA

(71) Applicant: James B. Skarie, Minnetonka, MN (US)

(72) Inventor: James B. Skarie, Minnetonka, MN (US)

(*) Notice: Subject to any disclaimer, the term of this patent is extended or adjusted under 35 U.S.C. 154(b) by 91 days.

(21) Appl. No.: 15/030,093

(22) PCT Filed: Oct. 17, 2014

(86) PCT No.: PCT/US2014/061153
§ 371 (c)(1),
(2) Date: Apr. 18, 2016

(87) PCT Pub. No.: WO2015/058092
PCT Pub. Date: Apr. 23, 2015

(65) Prior Publication Data
US 2016/0243895 A1 Aug. 25, 2016

Related U.S. Application Data

(60) Provisional application No. 61/892,789, filed on Oct. 18, 2013, provisional application No. 61/892,753, filed on Oct. 18, 2013.

(51) Int. Cl.
| | |
|---|---|
| *B60B 39/00* | (2006.01) |
| *B60B 39/08* | (2006.01) |
| *B60B 35/00* | (2006.01) |
| *B60B 39/02* | (2006.01) |
| *B60B 39/06* | (2006.01) |

(52) U.S. Cl.
CPC ............ *B60B 39/086* (2013.01); *B60B 35/00* (2013.01); *B60B 39/022* (2013.01); *B60B 39/023* (2013.01); *B60B 39/025* (2013.01); *B60B 39/06* (2013.01); *B60B 2900/551* (2013.01)

(58) Field of Classification Search
CPC ......... B60B 39/00; B60B 39/02; B60B 39/04; B60B 39/06
See application file for complete search history.

(56) References Cited

U.S. PATENT DOCUMENTS

| | | |
|---|---|---|
| 3,345,098 A | 10/1967 | Kilgore et al. |
| 4,878,320 A | 11/1989 | Woodson |

(Continued)

*Primary Examiner* — Robert J McCarry, Jr.
(74) *Attorney, Agent, or Firm* — Antonio Papageorgiou, Esq.; Meister Seelig & Fein LLP

(57) ABSTRACT

A traction media is provided that includes a plurality of axes having a distal origin point and proximal point termination surrounded by one or more faces thus forming a body capable of being delivered by hand or traction enhancing system to a lower surface such as the ground to provide an increased coefficient of friction between an upper surface such as a shoe or tire and the lower surface and a relative air movement duct is provided that includes a controlled path of flow through about a 90 degree angle having an intake, discharge and baffle capable of delivering traction media from a hopper/valve assembly by an air flow to a lower surface such as the ground to provide a controlled path of traction media between an upper surface such as a tire and a lower surface such as the ground.

16 Claims, 27 Drawing Sheets

(56) References Cited

U.S. PATENT DOCUMENTS

| | | | | |
|---|---|---|---|---|
| 6,371,532 B1* | 4/2002 | Skarie | ................... | B60B 39/025 |
| | | | | 291/2 |
| 2010/0151195 A1* | 6/2010 | Culler | ................... | B24D 11/00 |
| | | | | 428/142 |
| 2010/0151201 A1* | 6/2010 | Erickson | .............. | C09K 3/1409 |
| | | | | 428/148 |
| 2012/0227333 A1* | 9/2012 | Adefris | ................... | B24D 3/00 |
| | | | | 51/309 |

* cited by examiner

TRACTION MEDIA AND TRACTION ENHANCING SYSTEMS FOR DISPENSING SUCH TRACTION MEDIA

RELATED APPLICATION

This application claims the benefit of U.S. (Provisional) Application No. 61,892,789 and U.S. (Provisional) Application No. 61,892,753. The subject matter of the present application is related to U.S. Pat. No. 6,371,532, which is incorporated herein by reference.

BACKGROUND OF THE INVENTION

The present application relates to traction media that are used on surfaces to increase the coefficient of friction between, for example, vehicles, humans and animals, and such surfaces, and also traction enhancing systems for dispensing traction media.

In climates subject to winter conditions, where the ambient temperatures fall below 32 degrees Fahrenheit, freezing moisture causes hazardous ice to form on paved surfaces, such as roads and walkways. When encountering ice, vehicles lose the ability to stop and stay on course. Likewise humans and animals can have difficulty staying a foot.

In these climates, it is common practice to deposit sand or gravel to increase the coefficient of friction, or to deposit salt to melt the ice. Although doing so provides a measure of improvement, these methods are not optimal in solving the problem of hazardous ice. Natural media, for instance, have an irregular form, which result in the media when deposited often falling onto the ice so that their planar sides come into contact with the ice instead of the media's vertices which tend to bite into the surface of the ice. Salt in contrast is used primarily to melt ice and expose the road or walkway natural surface. Salt, however, performs this function over a period of time and therefore does not address the immediate need for traction and salt becomes completely ineffective once fully dissolved.

Traction enhancing systems have been proposed that deliver a traction enhancing media in the vicinity of the tire path of a vehicle to improve traction, vehicle stability and shorten stopping distance. Such systems primarily deposit natural media, such as sand or gravel, by dropping it from a hopper in the vicinity of a vehicle's tires. When a vehicle is in motion, this method can be largely ineffective due to the speed of the vehicle and atmospheric winds that may prevent the sand or gravel from being deposited directly under the tires where it is needed to improve traction, vehicle stability and shorten stopping distance.

Air ducts have been used in such traction enhancing system to direct traction enhancing media into the air stream where the media is delivered to the road surface, but these ducts have largely been ineffective. That is, these systems do not consistently and repeatedly deliver sand and/or gravel to the appropriate location in front of the vehicles tires in a regulated enough way to improve traction, vehicle stability and shorten stopping distance. Also, these systems routinely clog as a result of moisture caused clumping of the traction enhancing media.

Accordingly there is a need for a traction media and systems for depositing traction media that are not so limited.

SUMMARY OF THE INVENTION

In at least one aspect, a traction enhancing system is provided that includes a hopper for storing traction media; and a duct having an opening therein in communication with the hopper to supply traction media to the duct, the duct further having an intake at a front end, a discharge at a rear end, and a baffle located between the front and rear ends that delivers the traction media into air flow entering the front end of the duct.

In at least one embodiment, the duct redirects essentially horizontal airflow vertically toward the ground.

In at least one embodiment, the intake of the duct is about 90 degrees relative to the discharge of the duct.

In at least one embodiment, the baffle bisects airflow passing through the duct.

In at least one embodiment, the duct has a bend therein having an inner surface and wherein the baffle is located within the duct so that the baffle is essentially tangent to the inner surface.

In at least one embodiment, the baffle has a planer structure that is located at about 135 degrees relative to a direction of airflow.

In at least one embodiment, airflow is essentially horizontal.

In at least one embodiment, the hopper comprises a valve at the opening and an actuator that controls opening and closing of the valve.

In at least one embodiment, the hopper comprises a dry air inlet in communication with an intermediate chamber within the hopper.

In at least one embodiment, the traction media comprise a body with a plurality of surfaces, the surfaces intersecting to form a plurality of vertices each having an axis extending from a common proximal end to a distal ends, the surfaces and axes configured so that when the traction media is deposited on a flat surface, planer surfaces do not come into contact with the flat surface.

In at least one embodiment, the traction media comprise a body with a plurality of surfaces, the surfaces intersecting to form a plurality of vertices each having an axis extending from a common proximal end to a distal ends, the surfaces and axes configured so that when the traction media is deposited on a flat surface, only the vertices come into contact with the flat surface.

In at least one embodiment, the traction media comprise four axes therewith forming four vertices.

In at least one embodiment, the traction media comprise six axes therewith forming four vertices.

In at least one embodiment, each of the axes is essentially perpendicular to at least four of the other axes.

In at least one embodiment, each of the axes is surrounded by three planer faces.

In at least one embodiment, the planer faces of each of the axes interest with the planer faces of at least two the axes to form a triangle.

In at least one embodiment, the triangle is an equilateral triangle.

Additional aspects of the present invention will be apparent in view of the description which follows.

DETAILED DESCRIPTION OF THE INVENTION

Figure 1:
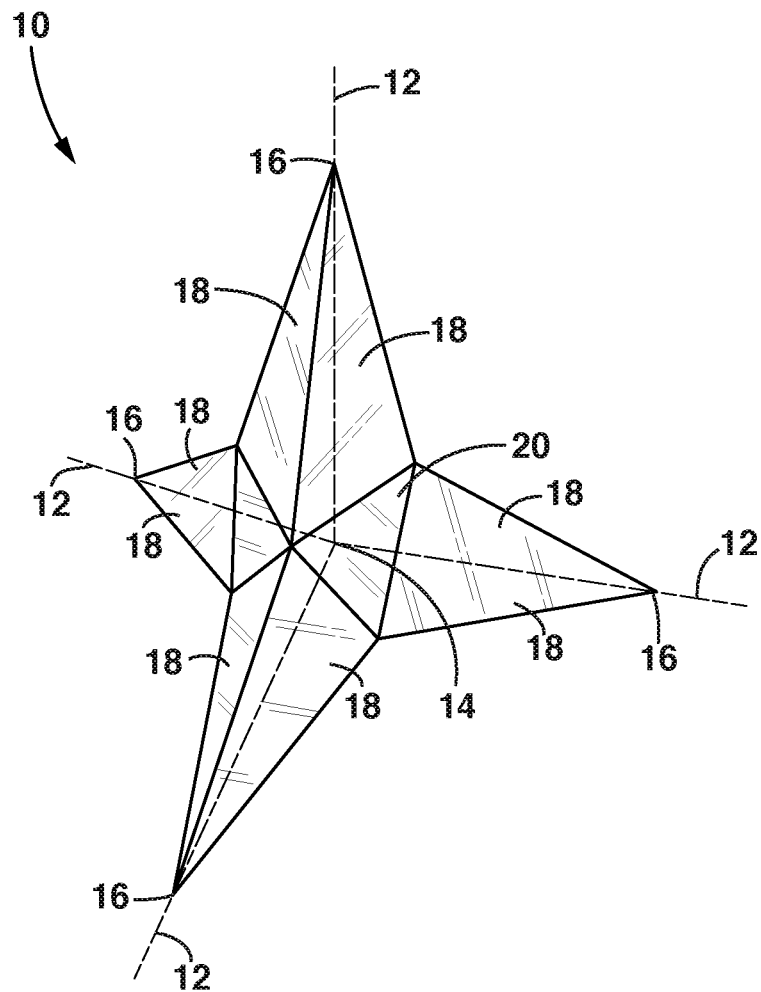
FIG. 1 is a perspective view of a unit of traction media.
Figure 2:
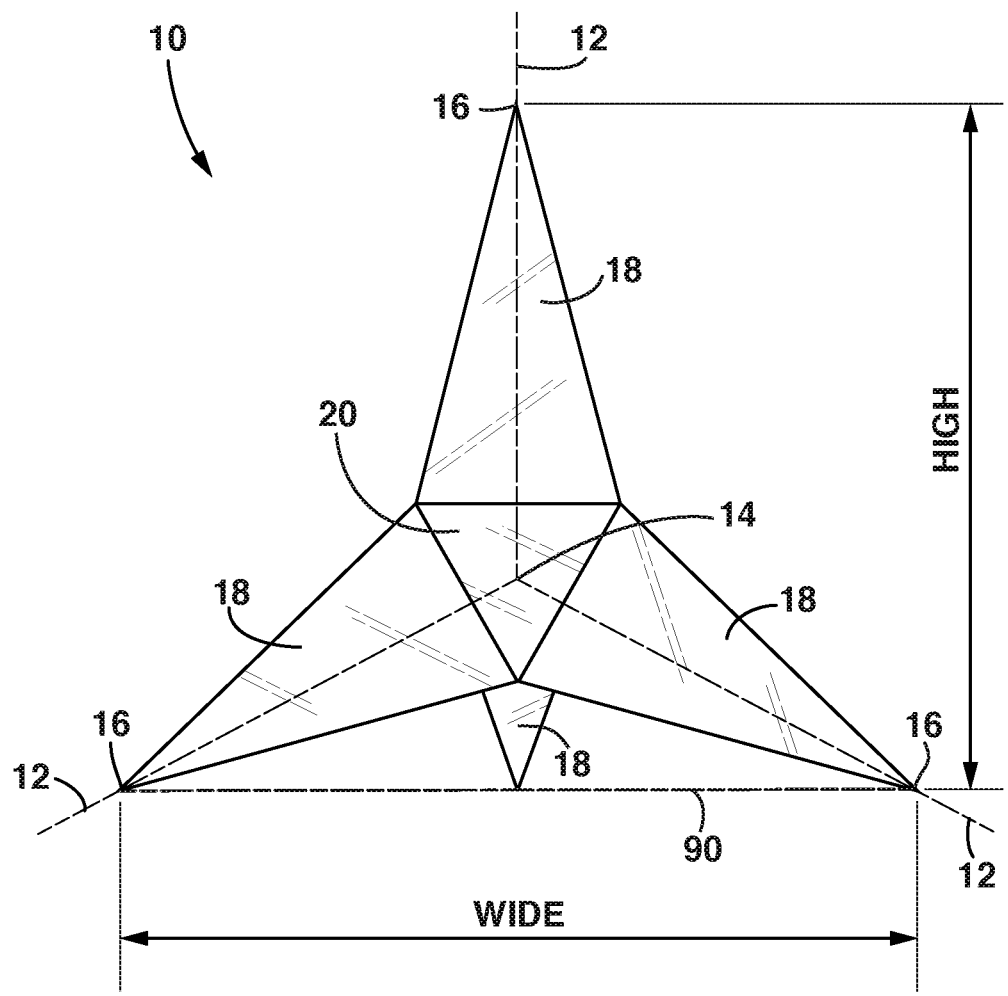
FIG. 2 is a front view of FIG. 1.
Figure 3:
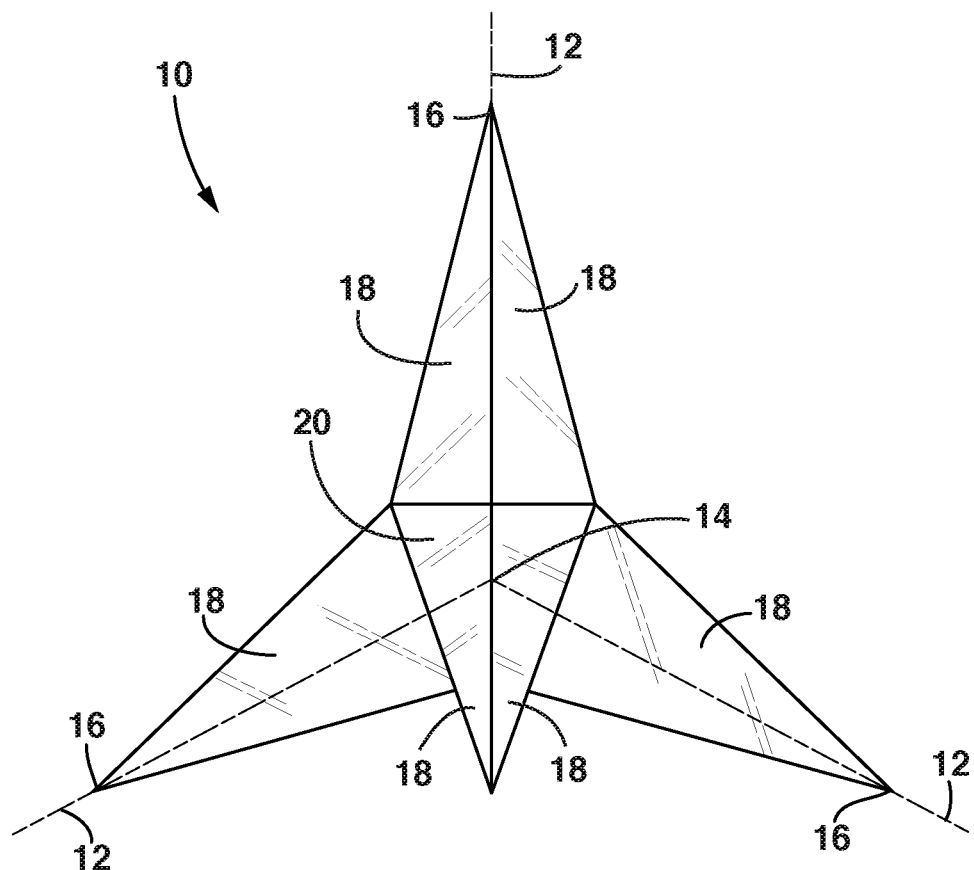
FIG. 3 is a back view of FIG. 1.
Figure 4:
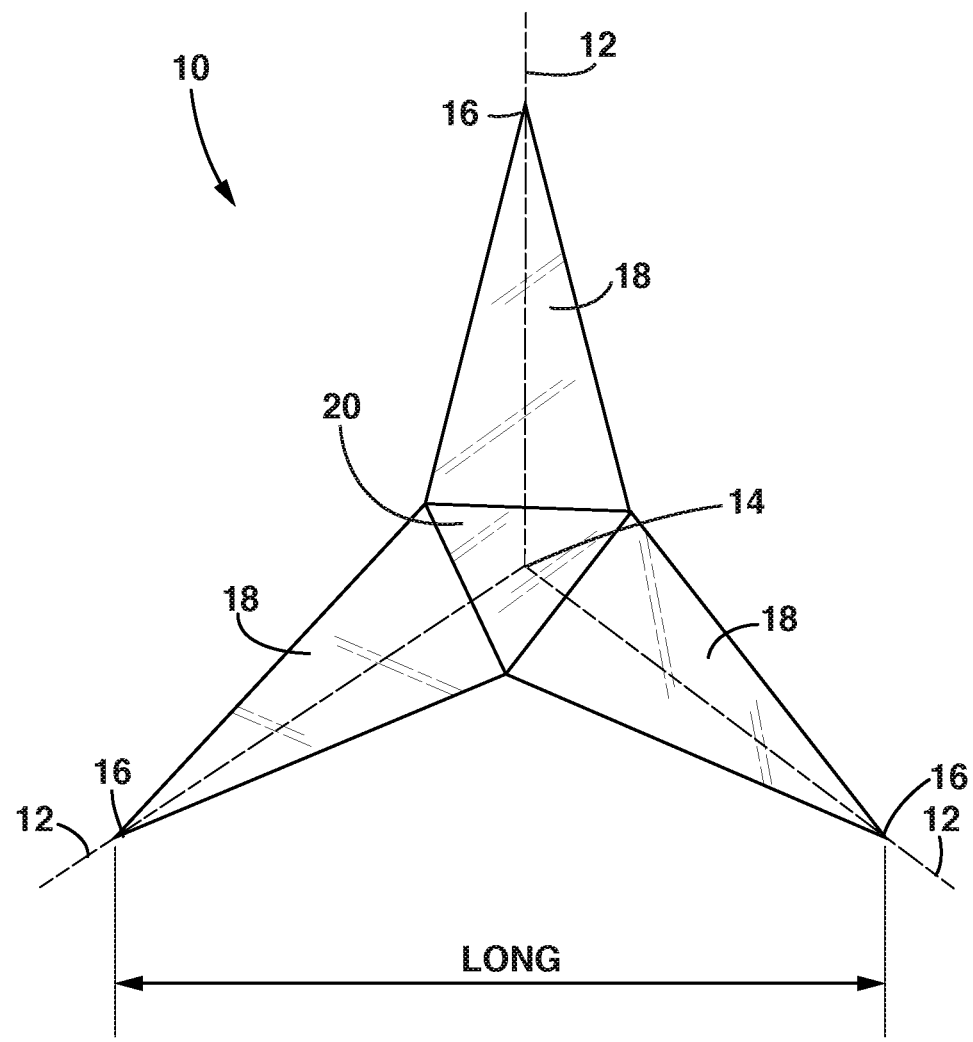
FIG. 4 is a right side view of FIG. 1.
Figure 5:
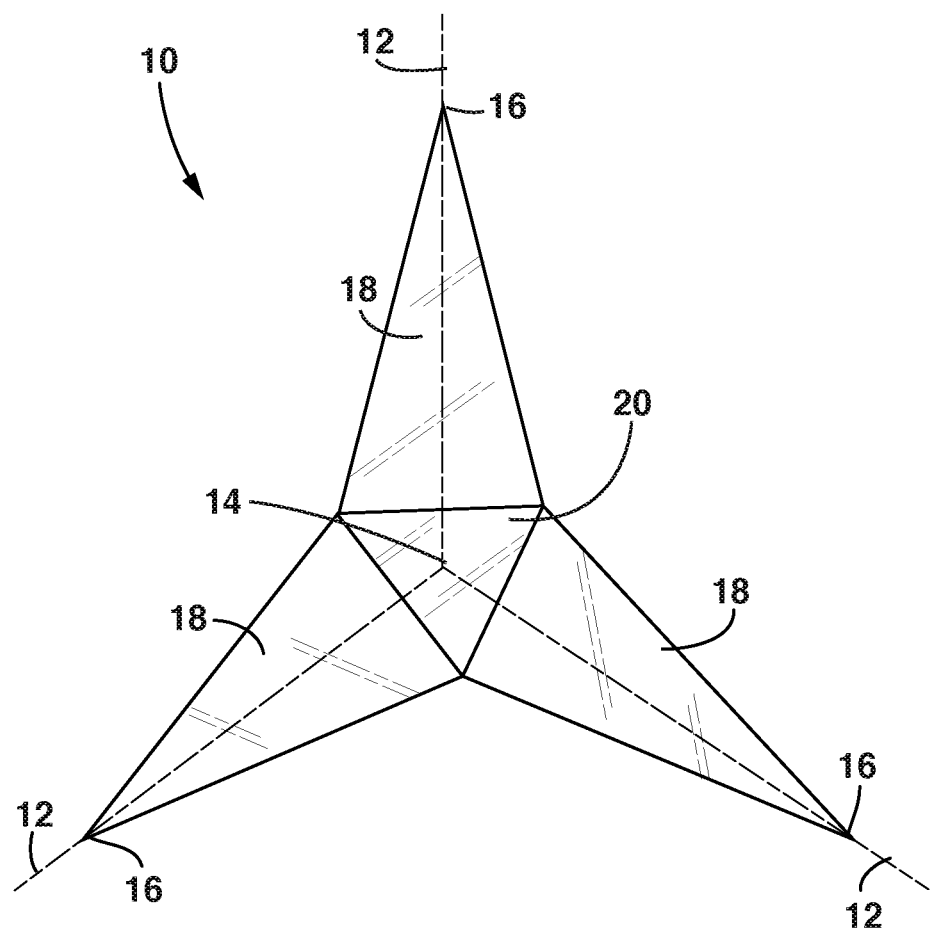
FIG. 5 is a left side view of FIG. 1.
Figure 6:
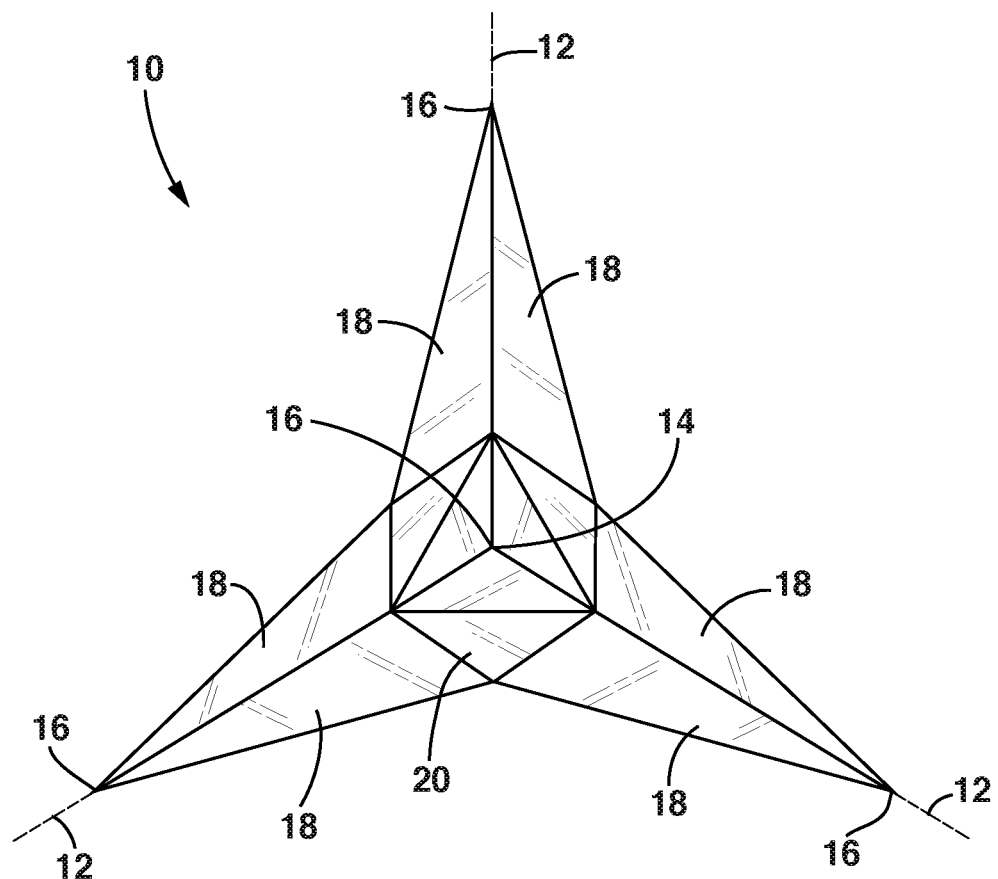
FIG. 6 is a top view of FIG. 1.
Figure 7:
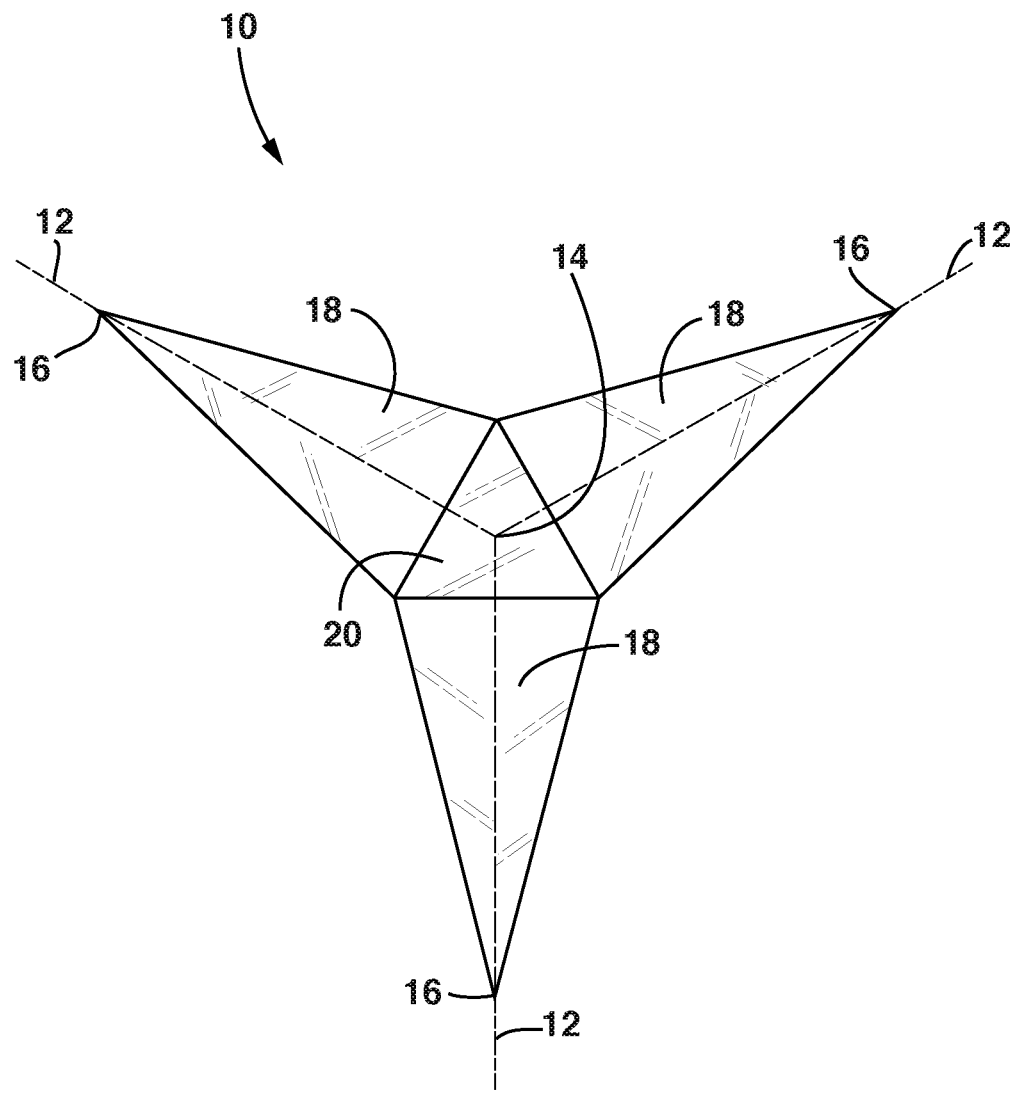
FIG. 7 is a bottom view of FIG. 1.
Figure 8:
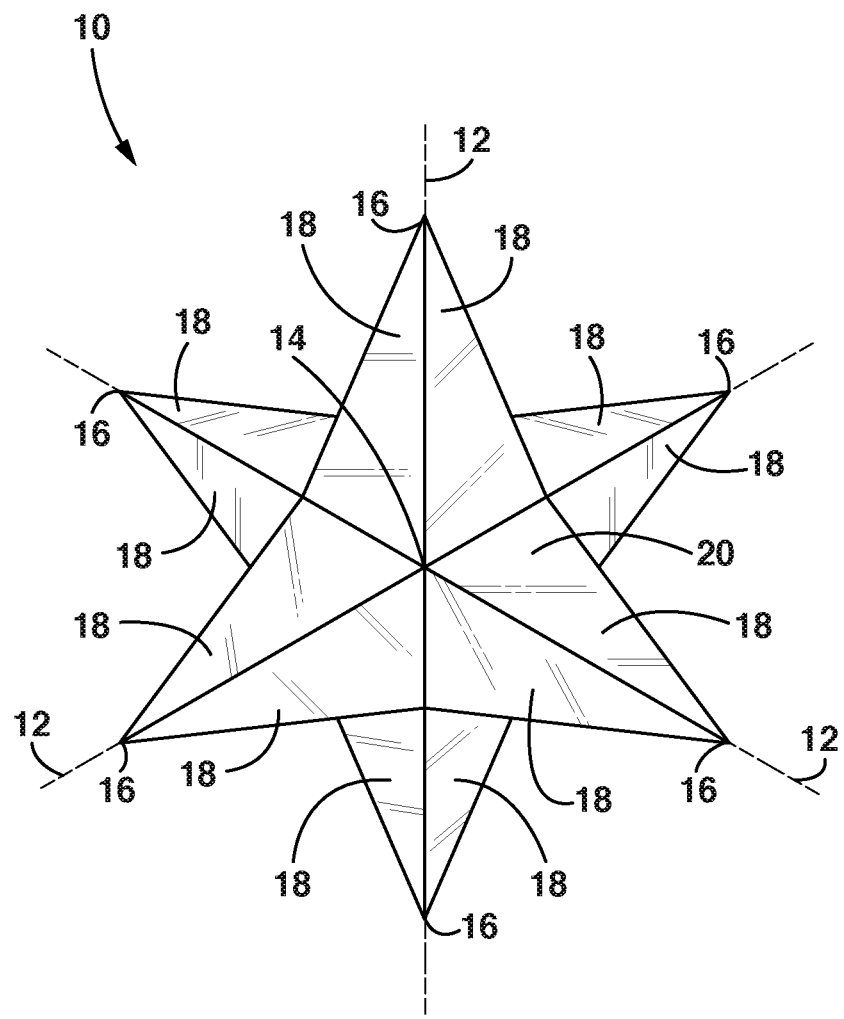
FIG. 8 is a perspective view of a second embodiment of a unit of traction media.
Figure 9:
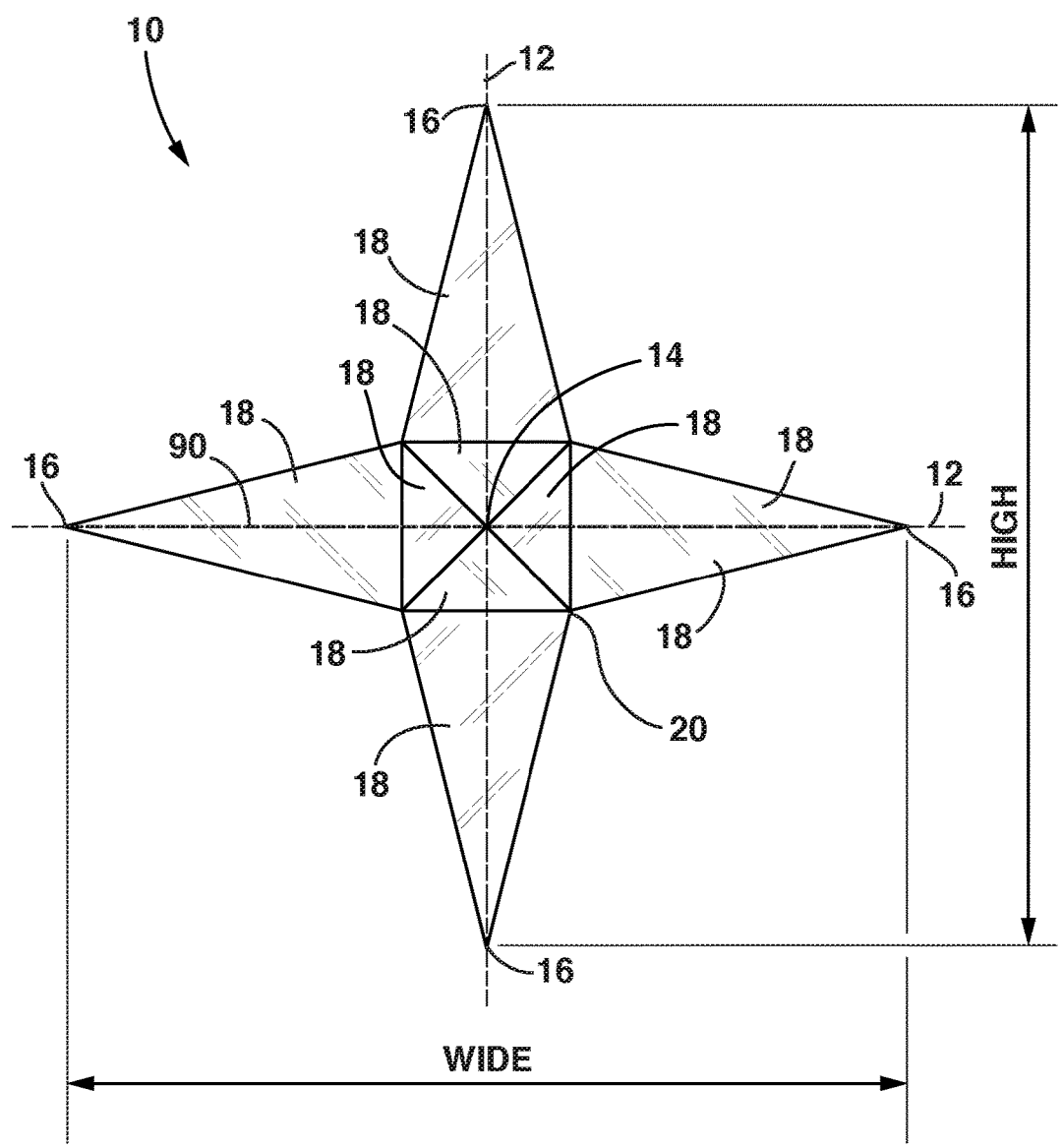
FIG. 9 is a front view of FIG. 8.
Figure 10:
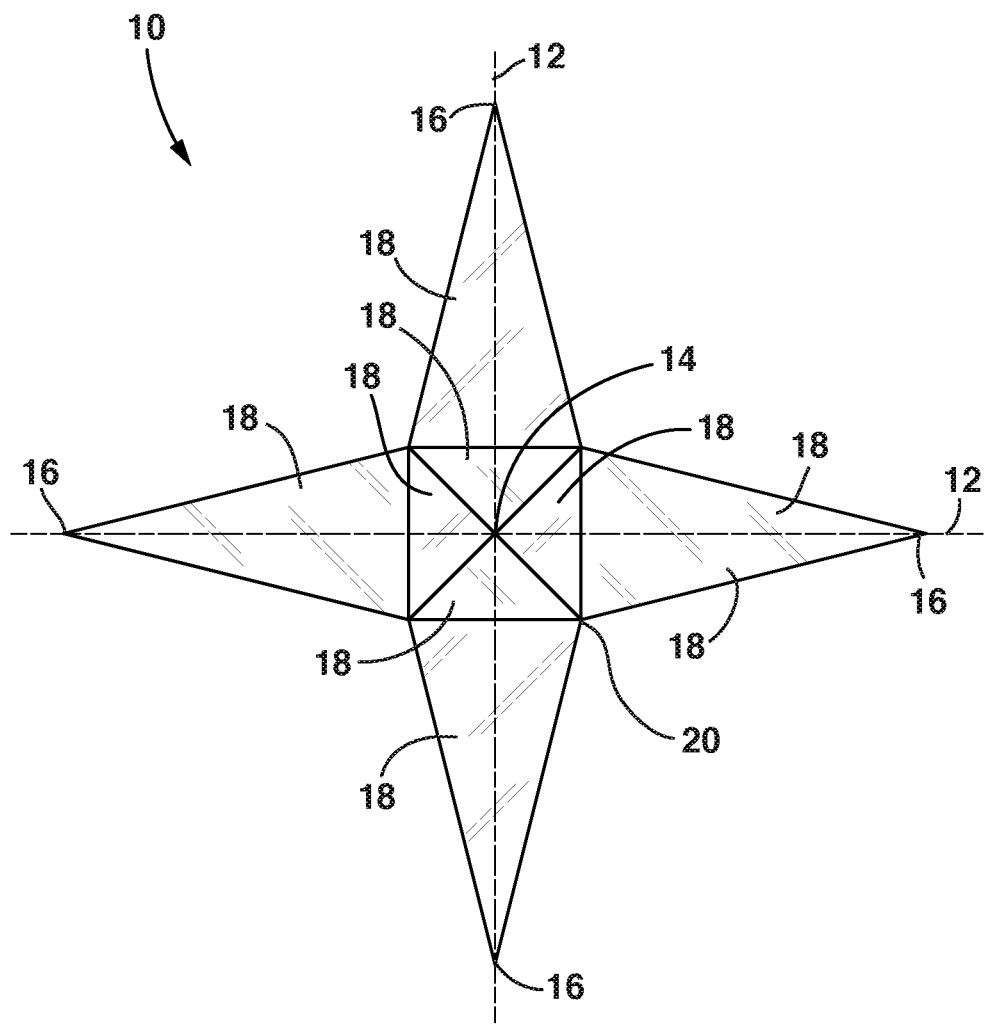
FIG. 10 is a back view of FIG. 8.
Figure 11:
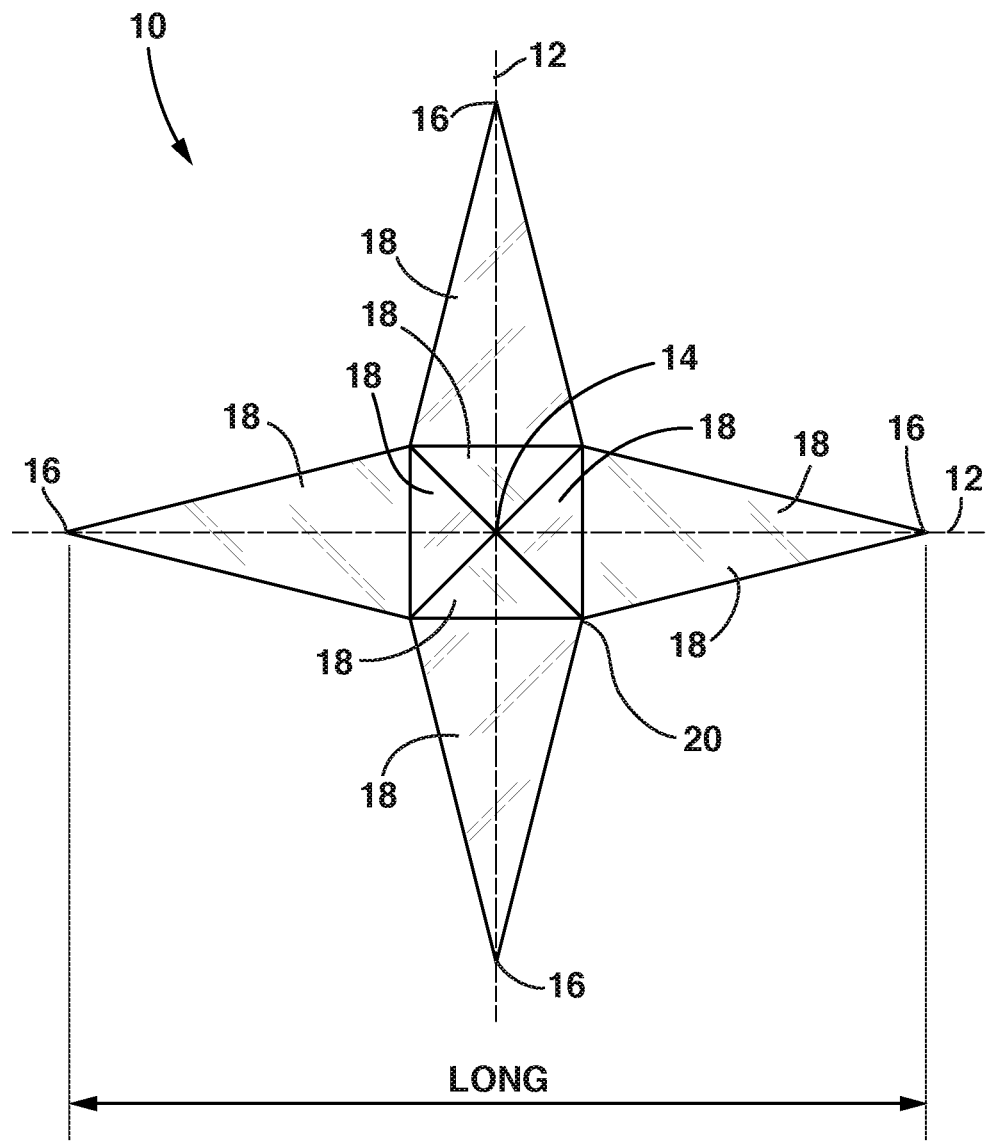
FIG. 11 is a right side view of FIG. 8.
Figure 12:
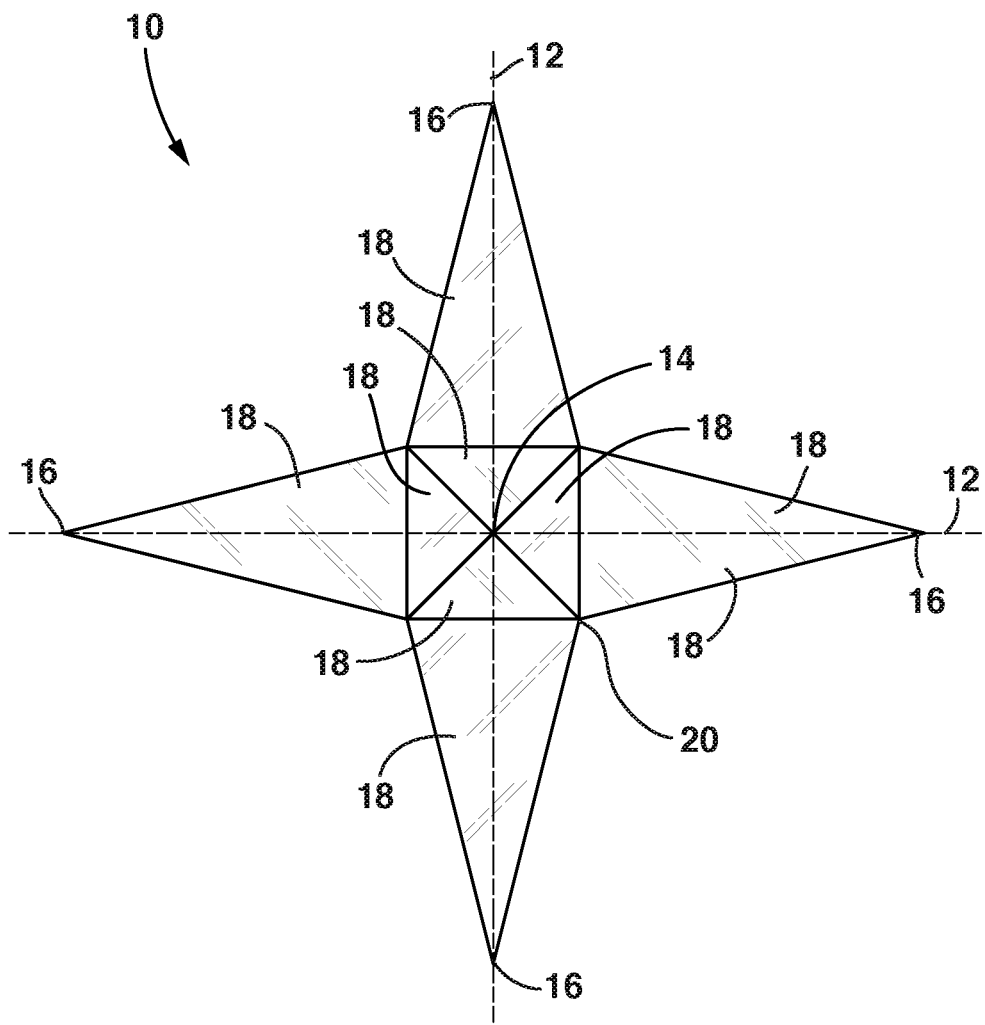
FIG. 12 is a left side view of FIG. 8.
Figure 13:
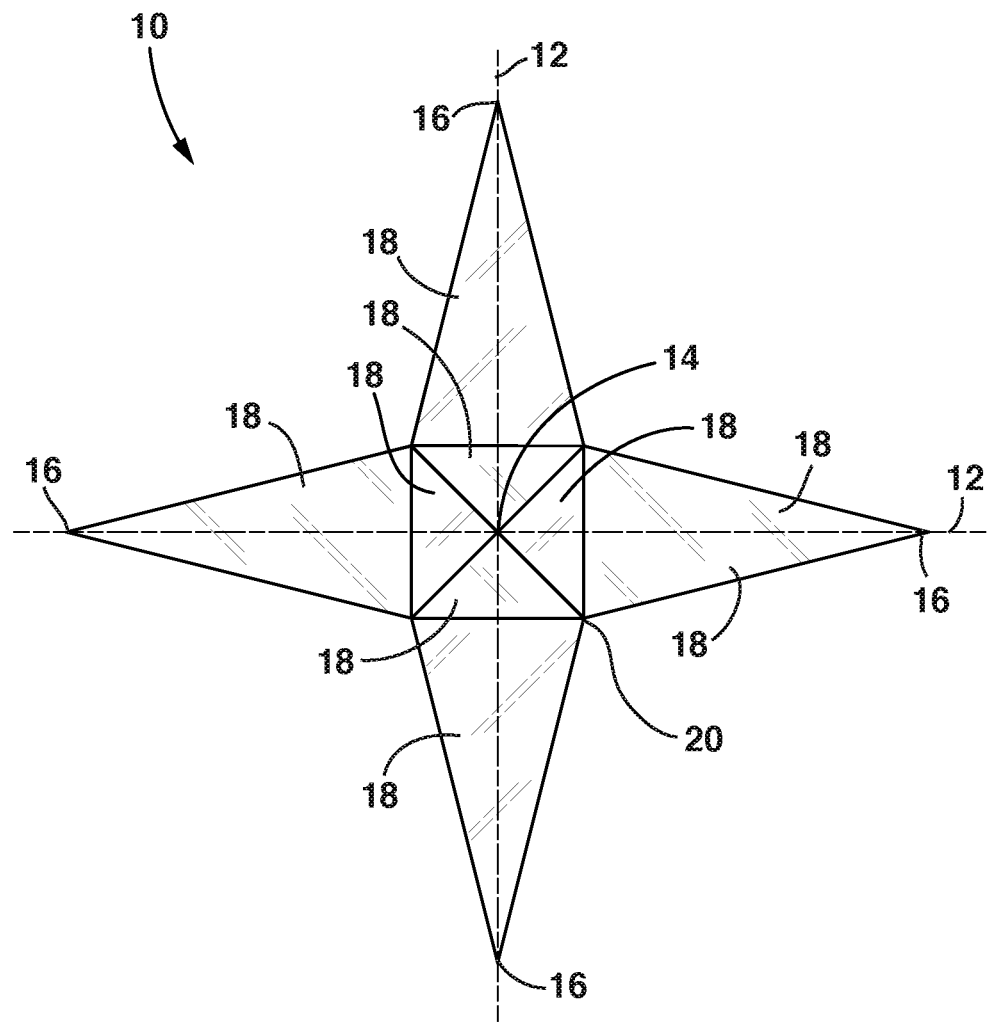
FIG. 13 is a top view of FIG. 8.
Figure 14:
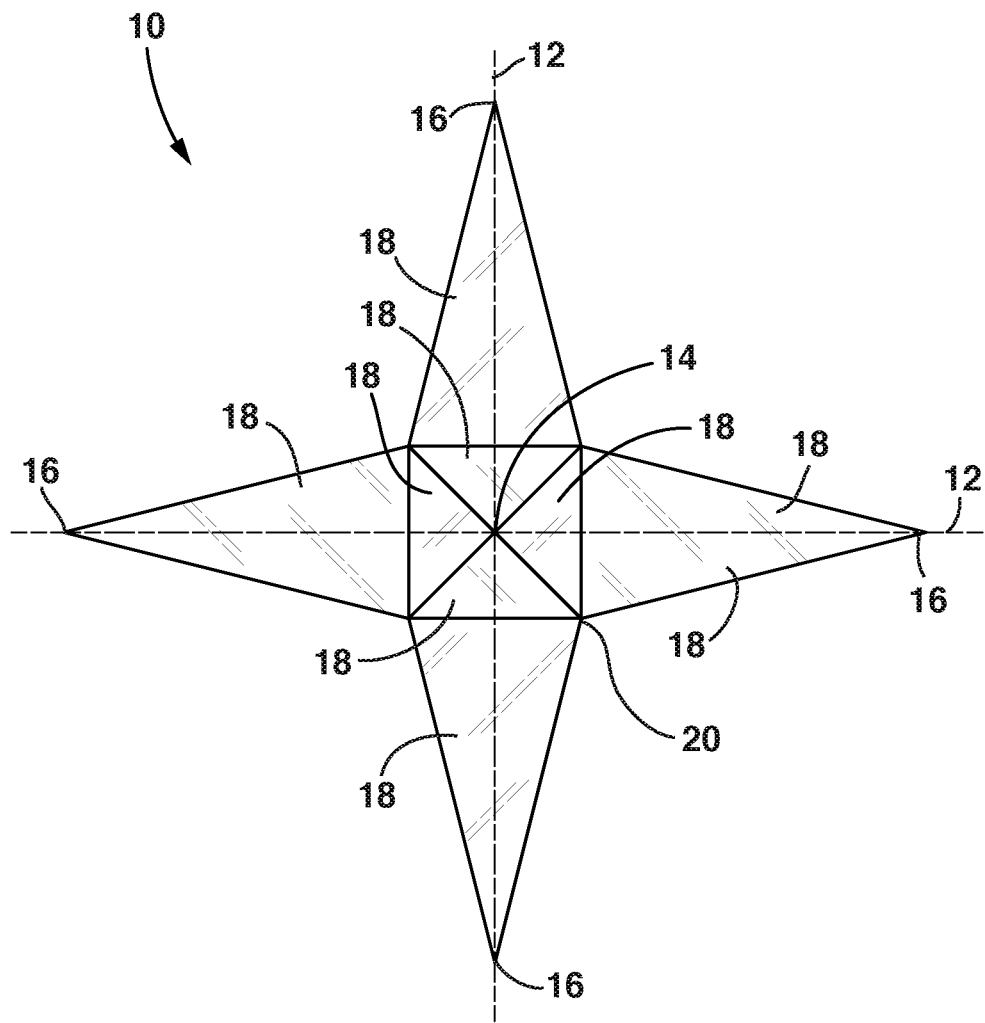
FIG. 14 is a bottom view of FIG. 8.
Figure 15:
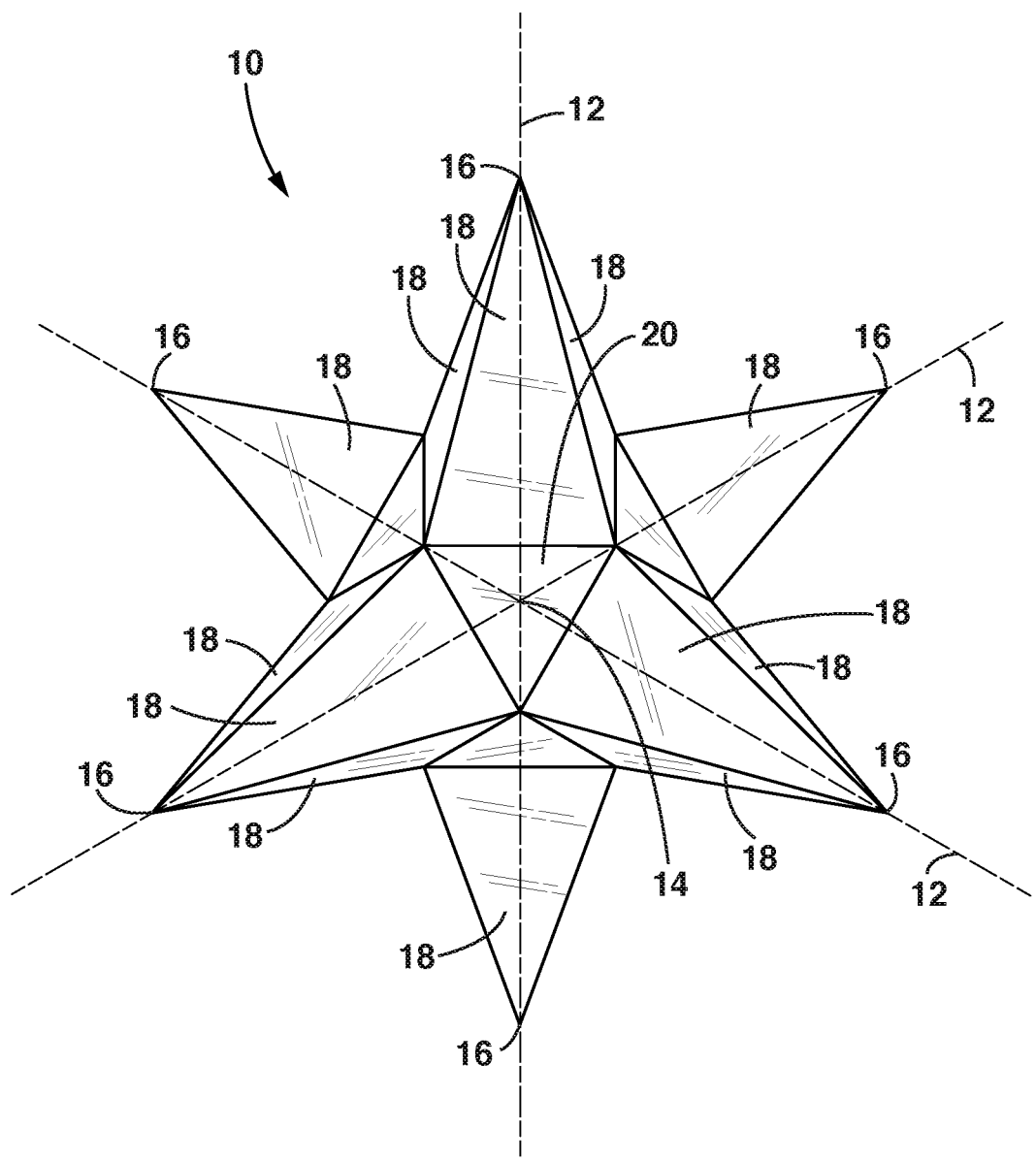
FIG. 15 is a perspective view of a third embodiment of a unit of traction media.
Figure 16:
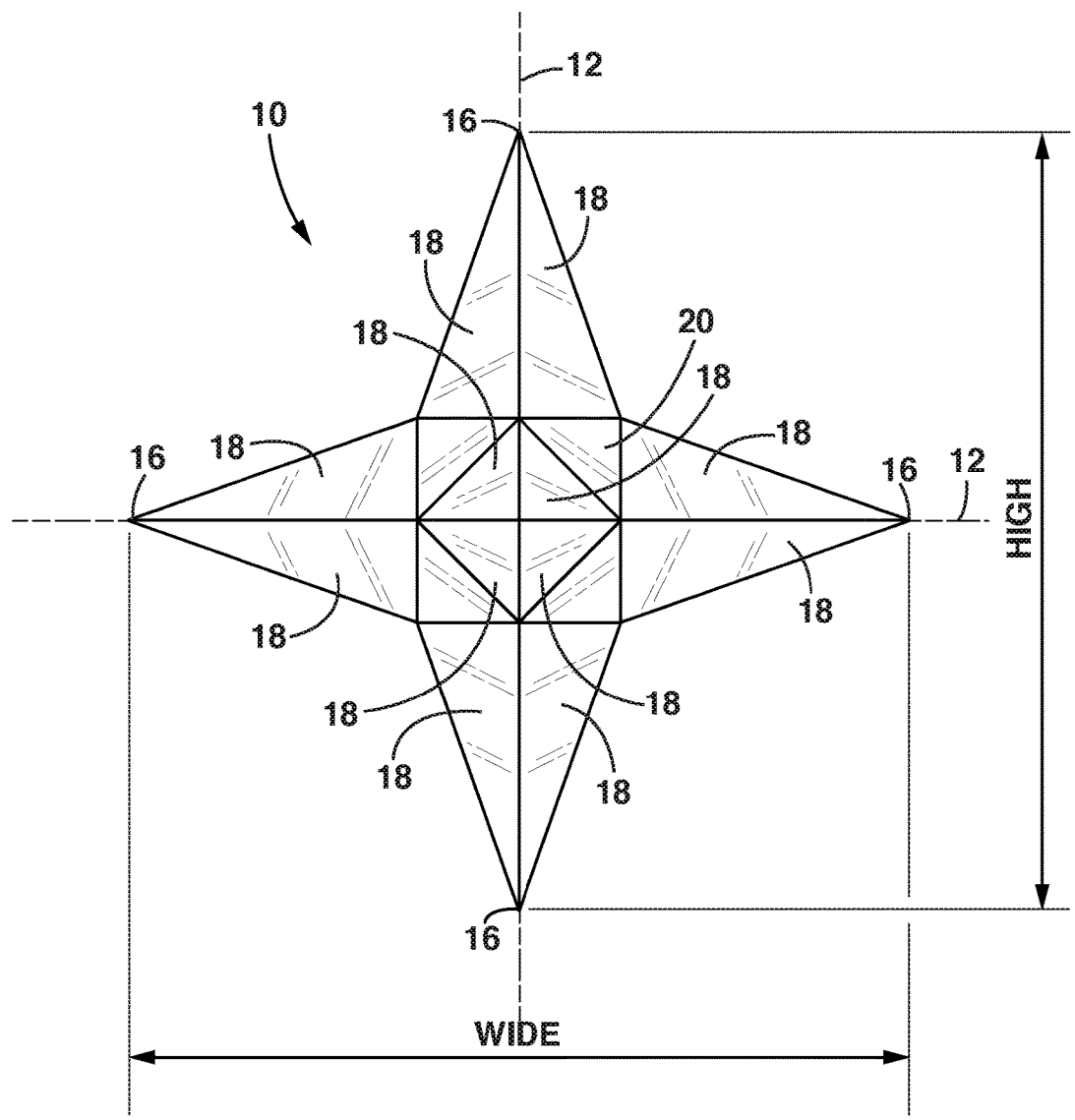
FIG. 16 is a front view of FIG. 15.
Figure 17:
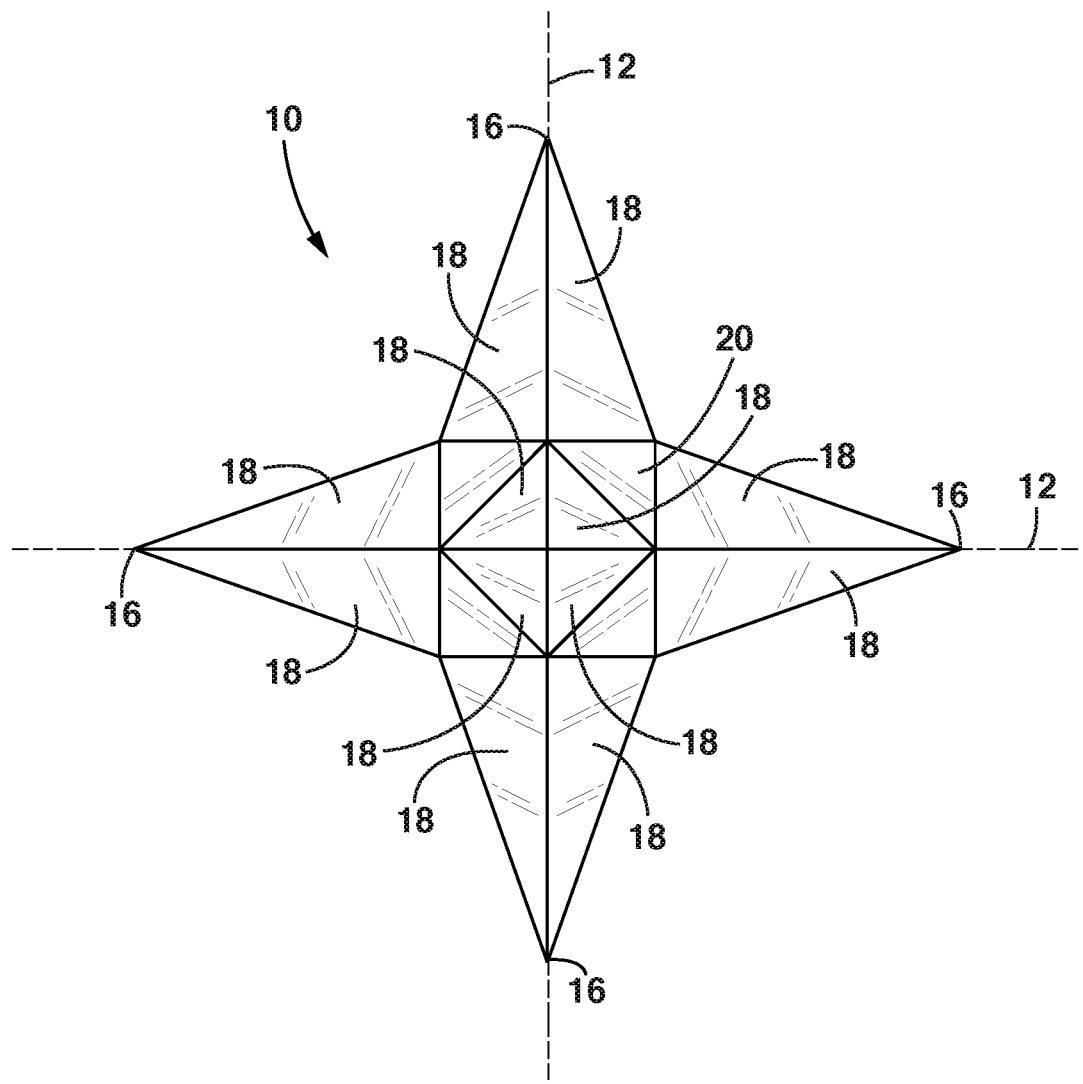
FIG. 17 is a back view of FIG. 15.
Figure 18:
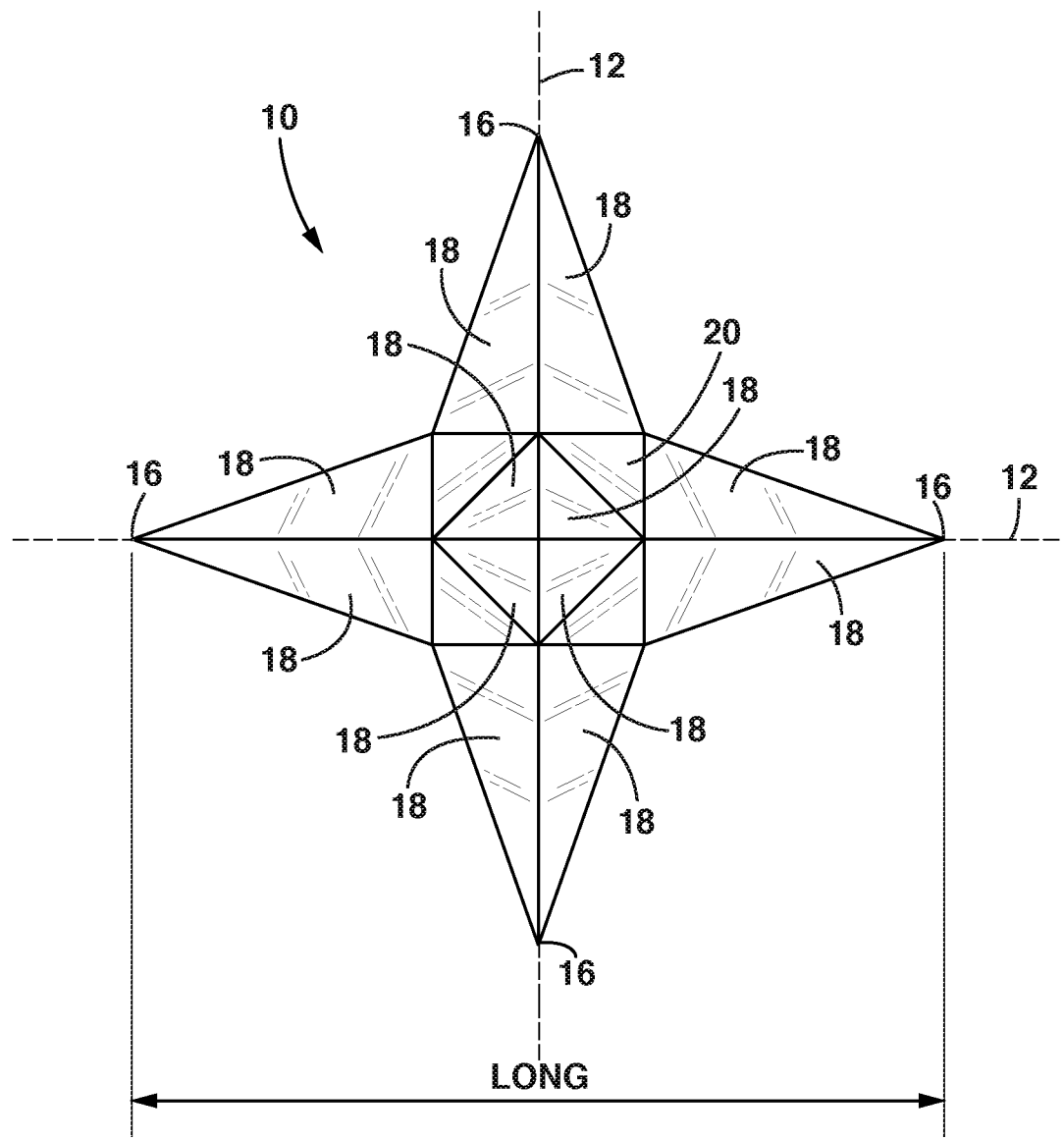
FIG. 18 is a right side view of FIG. 15.
Figure 19:
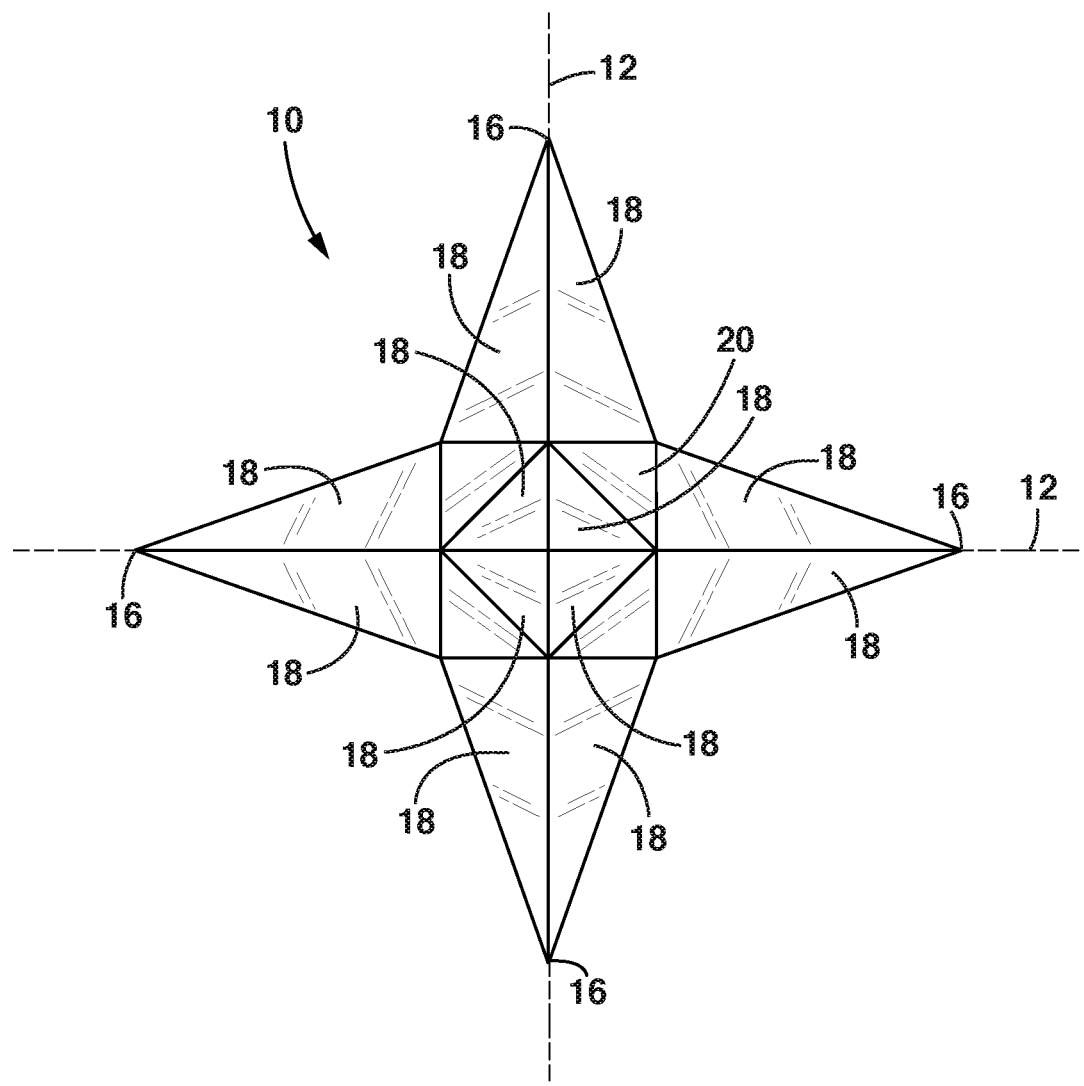
FIG. 19 is a left side view of FIG. 15.
Figure 20:
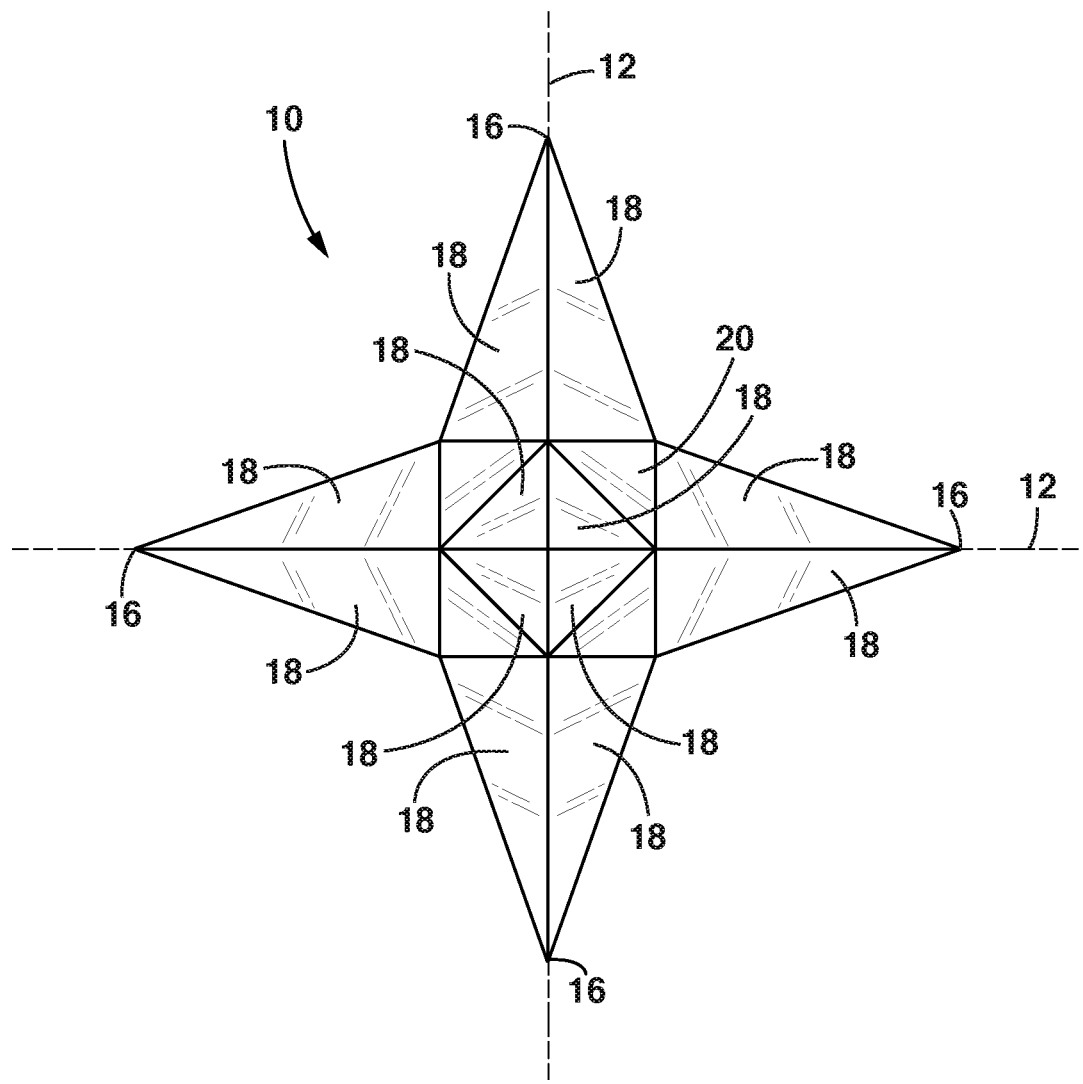
FIG. 20 is a top view of FIG. 15.
Figure 21:
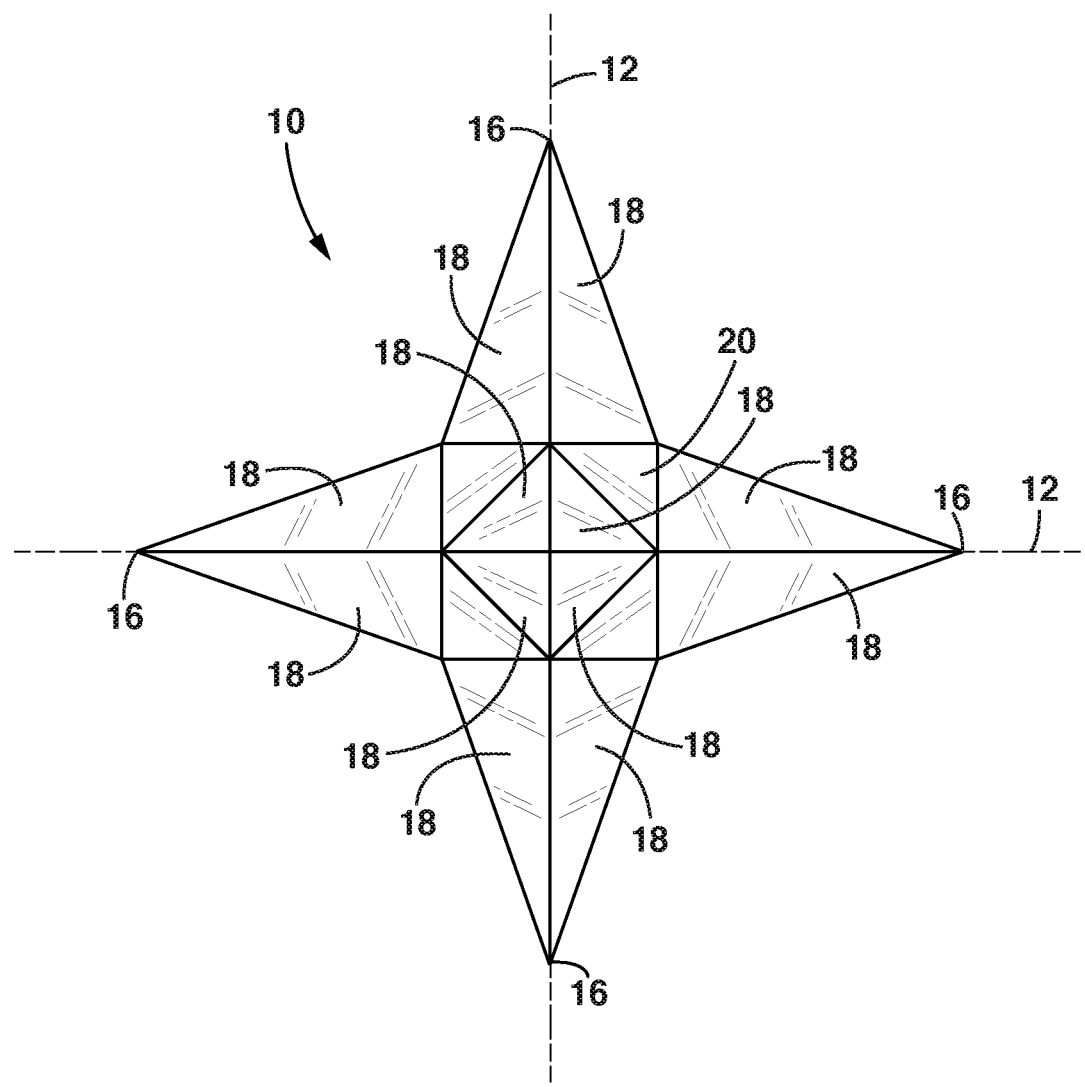
FIG. 21 is a bottom view of FIG. 15.

Referring to FIG. 1 through FIG. 28, traction media 10 are provided that includes a plurality of the axes 12, each having a distal origin point 16 and a common proximal termination point 14, surrounded by one or more of the faces 18, thus forming the body 20 of the media 10 which is capable of being delivered by hand or the traction enhancing system 32 to lower surface 24, such as the ground 30, to increase friction between the upper surface 22, such as a shoe 28 or tire 26, and the lower surface 24. Lower surfaces 24 can be substances such as ice, snow, water and other substances with a low coefficient of friction.

Referring FIG. 1 through FIG. 7, in at least one embodiment, traction media 10 are provided that have four axes 12 and each of the four axes 12 is essentially perpendicular to a reference plane 90 that touches each of the distal origin points 16 of the other three axes 12. The three other axes 12 are preferably positioned equidistant around each of the axes 12, i.e., so that the axes 12 have angles of about 155, (e.g., +/−10 degrees) relative to each of the other axes 12. In this embodiment, each axis 12 is surrounded by three plane triangular faces 18, thus the joined faces 18 form a body 20. The body 20 can be molded or cast from glass, plastic or any other material known in the arts to form traction media 10. The traction media 10 can range in an overall size of about 0.03125 inches high by 0.03125 long inches by 0.03125 inches wide to about 0.2500 inches high by 0.2500 long inches by 0.2500 inches wide, (e.g., +/−10 percent). In another embodiment this configuration could have a singular face 18 forming a cone surrounding each axis 12. In yet other embodiments, more than three faces 18 could be present surrounding each axis 12.

Referring to FIG. 8 through FIG. 14, in one embodiment, the traction media 10 are provided that have six axes 12, at least two of which are perpendicular to a reference plane 90 where four other axes 12 lie (that is, the distal origin points 16 and proximal termination point 14 of the other four axes 12 touch the reference plane). The axes 12 are preferably positioned equidistant around at least four of the other axis 12, i.e., so that the axes 12 have angles of about 90 degrees, (e.g., +/−10 degrees) relative to the four other axis 12. In this embodiment, each axis 12 is surrounded by four plane triangular faces 18, thus the joined faces 18 form a body 20. The body 20 can be molded or cast from glass, plastic or any other material known in the arts to form traction media 10. The traction media 10 can range in an over all size of about 0.03125 inches high by 0.03125 long inches by 0.03125 inches wide to about 0.2500 inches high by 0.2500 long inches by 0.2500 inches wide, (e.g., +/−10 percent). In another embodiment this configuration could have a singular face 18 forming a cone surrounding each axis 12. In yet other embodiments, three or five or more faces 18 could be present surrounding each axis 12.

Referring to FIG. 15 through FIG. 21, in at least one embodiment, the six axes 12 traction media 10 have faces 18 that intersect with the faces of the other axes 12 to form a triangle, preferably an equilateral triangle.

Figure 22:
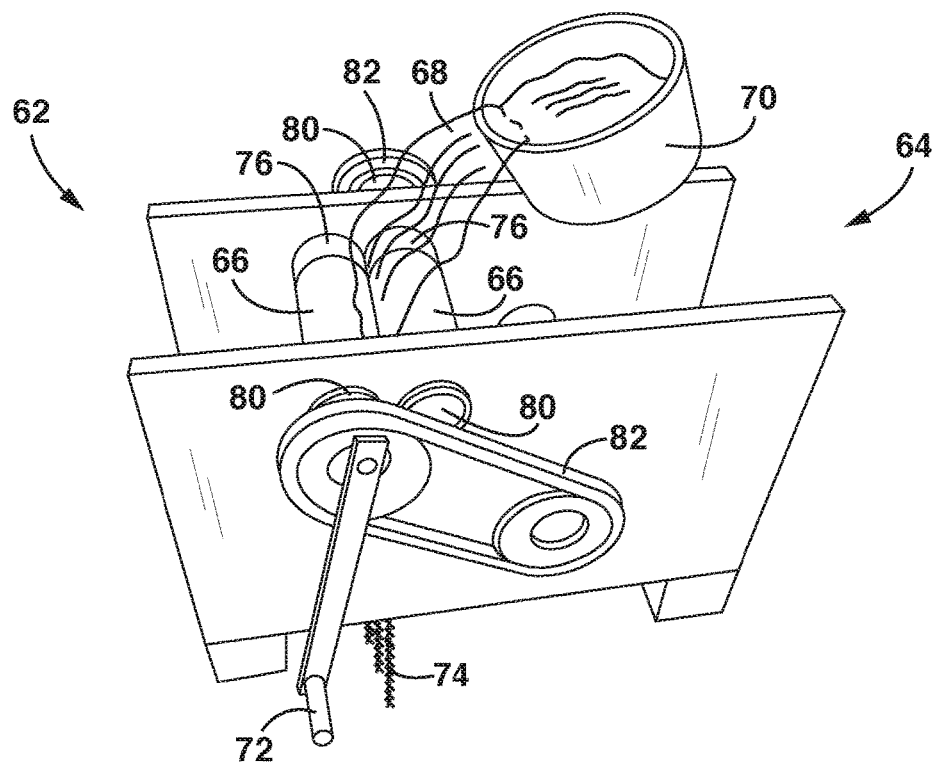
FIG. 22 is a perspective view of a device for molding traction media.
Figure 23:
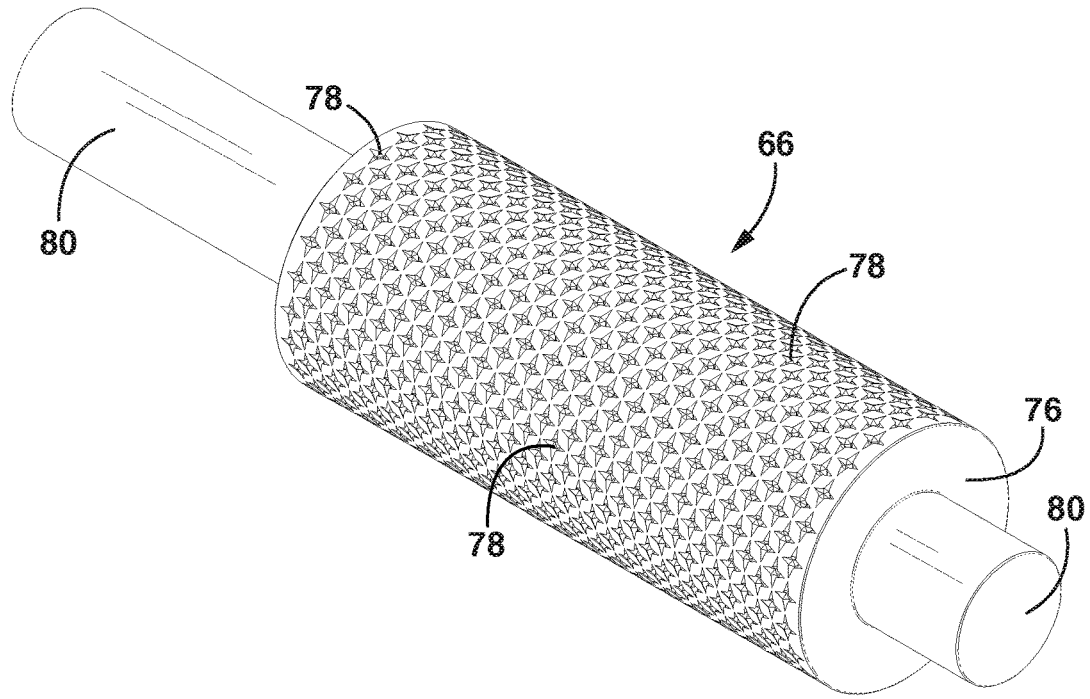
FIG. 23 is a perspective view of a mold.
Figure 24:
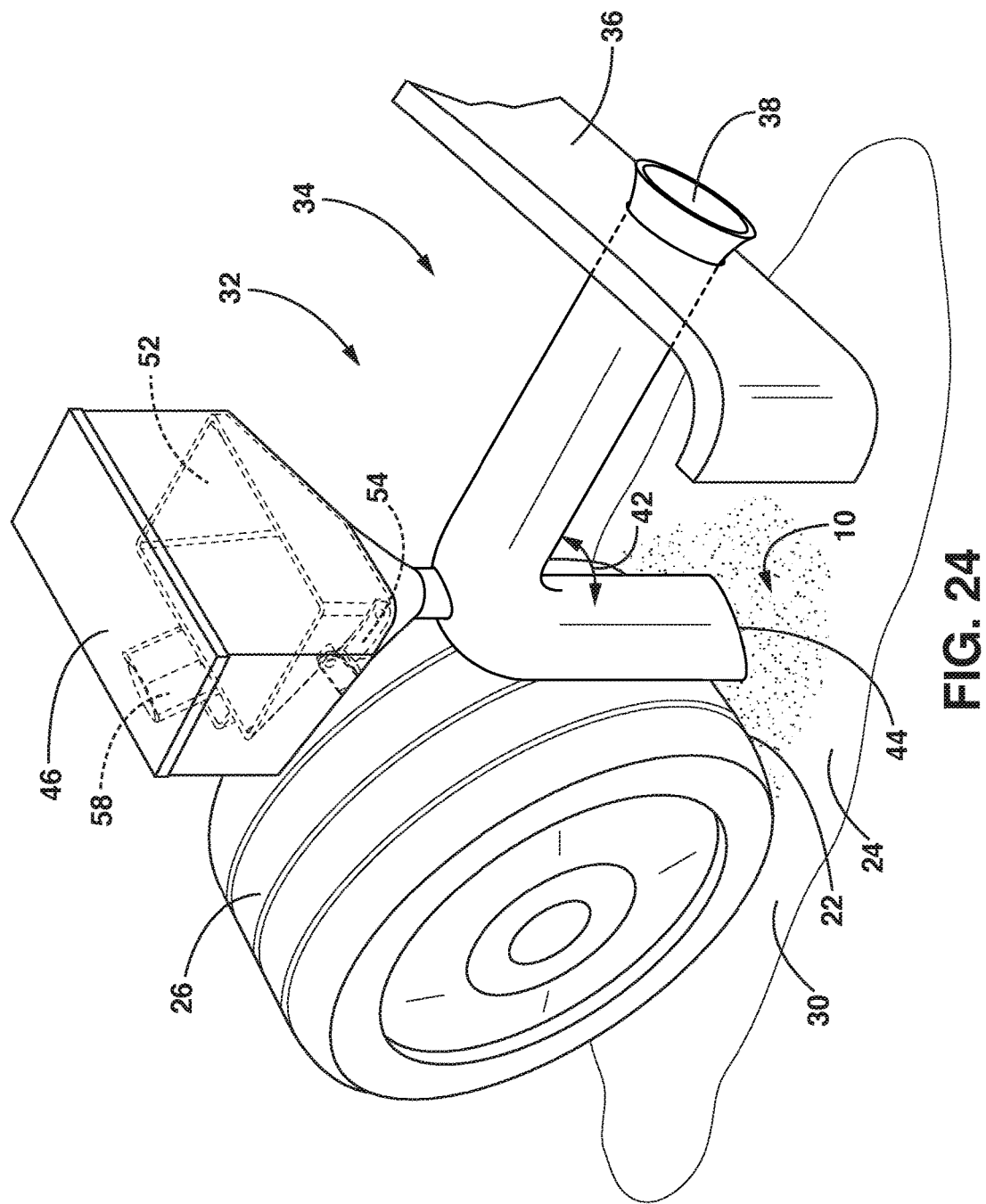
FIG. 24 is a perspective view of traction media, in use, in a traction enhancing system used on a motor vehicle.
Figure 25:
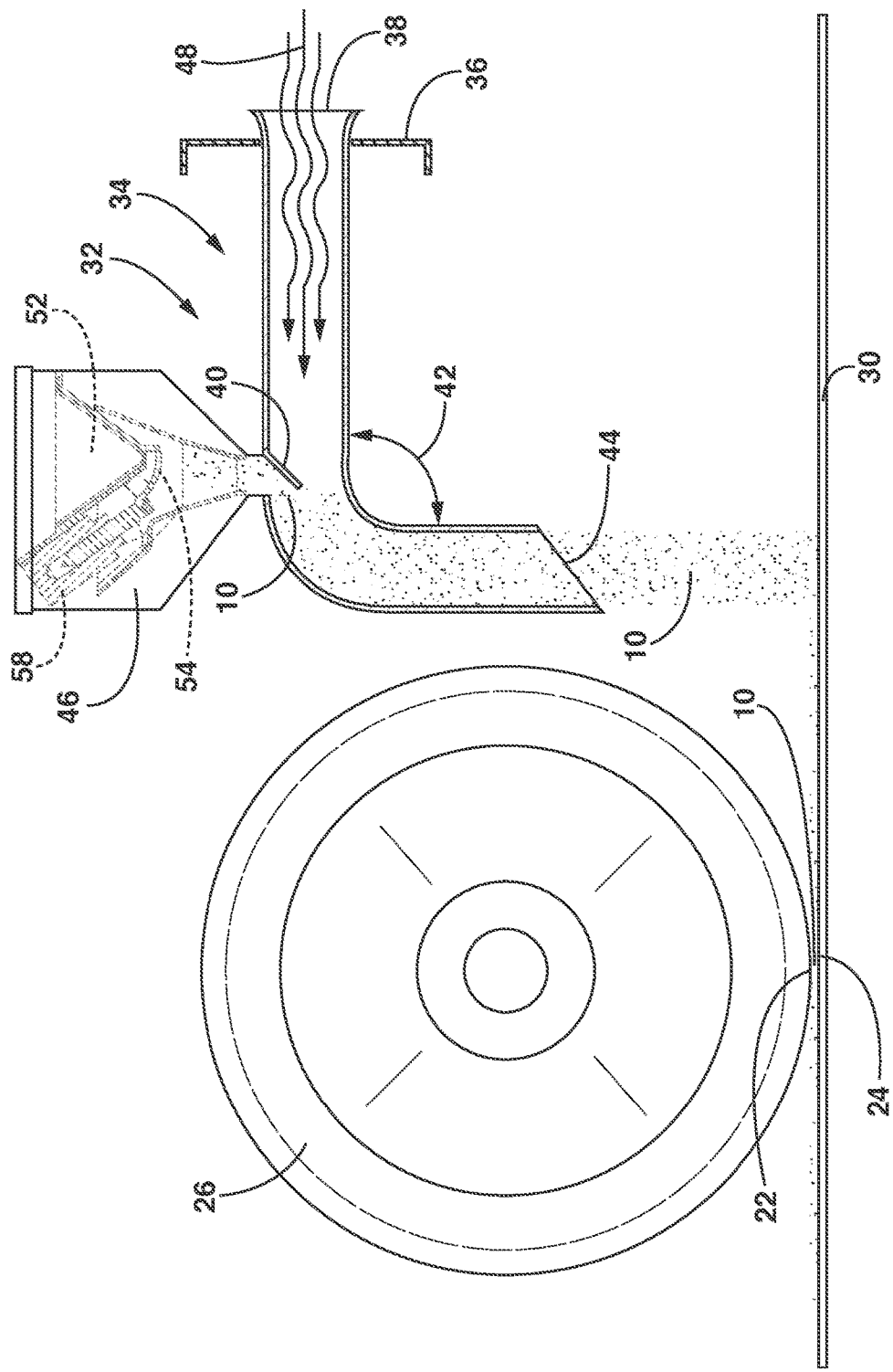
FIG. 25 is a section view of FIG. 24.

Traction media 10 can be manufactured in a multitude of ways. Referring to FIG. 22 and FIG. 23, in at least one embodiment, the traction media is produced by a molding process 62 using a molding machine 64. A molding machine 64 can be a manual driven machine, semi-automated or fully automated. A molding machine 64 deploys the use of the centrifugal mold 66. The centrifugal mold 66 is rotated by the drive means 72 that provides power to propel the drive system 82. The drive system 82, in turn, provides power to simultaneously turn the shafts 80 and the cylinders 76 in the particular fashion of match aligning the traction media molding cavities 78 located on adjacent cylinders 76.

A molding machine 64 accomplishes the traction media molding process 62 while being powered. The crucible 70 contains the molten material 68 that is poured in between at least two cylinders 76, comprising a centrifugal mold 66. Molten material 68 solidifies in adjacent traction media molding cavities 78 forming the sheet of traction media 74 that continuously exits the bottom of centrifugal mold 66. Later the sheet of traction media 74 is broken into traction media 10 by vibration.

A sheet of traction media 74 measures about 0.03125 inches in thickness measured between distal points 16 of traction media 10. As a sheet of traction media 74 is broken by vibration, a nominal amount of near powder like discarded material is left in the mix. At a later time traction media 10 may be further shorted from discard material by a mechanical screening process.

Referring FIG. 24 through FIG. 27, in at least one embodiment, the traction media 10 are shown, in use, in a traction enhancing system 32 used on a motor vehicle. The system 32 preferably includes a duct through which air flows and is combined with the traction media 10 and delivered to a lower surface 24, such as the ground 30, to increase the coefficient of friction and provide a controlled path of traction media 10 between an upper surface 22, such as a tire 26, and a lower surface 24, such as ground 30.

Figure 28:
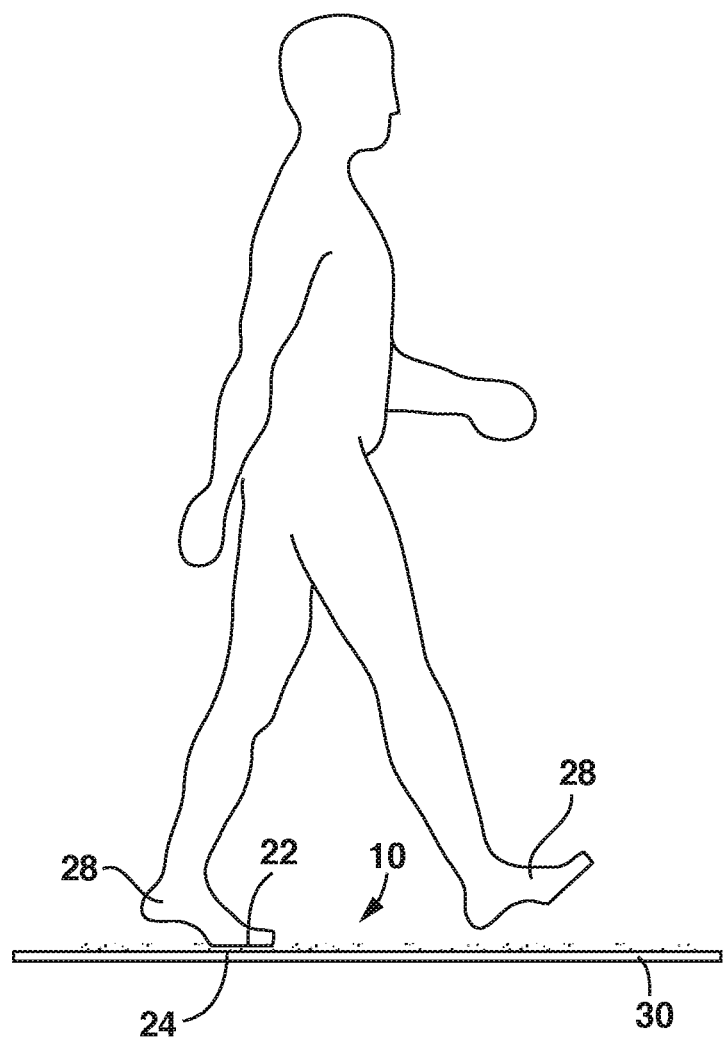
FIG. 28 is a side view of traction media, in use, below a pedestrian walking.

Referring to FIG. 28, the traction media 10 are shown, in use, as a person walking where a traction media 10 has been hand delivered to a lower surface 24, such as the ground 30, to increase the coefficient of friction and provide a path of traction media 10 between an upper surface 22, such as a foot 28, and a lower surface 24, such as ground 30. Lower surfaces 24 can be substances such as ice, snow, water and other substances with a low coefficient of friction.

The above description is given as an example of structure and use for domestic vehicle and pedestrian application. In other macro and micro embodiments the above-mentioned dimensions can vary in proportion to the application. As examples, a macro embodiment of the invention could be larger dimensions to accommodate mining trucks and super sized vehicles or smaller dimensions to accommodate micro embodiments such as drone aircraft or super small robotic controlled vehicles.

Traction media 10 can be used as an additive to other materials, such as concrete or epoxy coating or in any situation were it is desirable to increase the coefficient of friction of a material.

Traction media 10 can be clear or any color, such as red or orange to enhance its visibility and warn of a slippery surface 24 or give it ornamental appeal.

Traction media 10 can be identification marked by various forms of tagging, such as ultraviolet, and other forms of light sensitive inks and other substances, as well as radio active and other frequency emitting forms of electronic tagging and identity sensing.

Referring more to FIG. 24 through FIG. 27, the system 32 includes a relative air movement duct 34 that directs a controlled path of air flow 48 from intake 38 at a front of a vehicle, through an about 90 degree angle bend 42 (e.g., +/−10 degrees), to a discharge 44 located in front of the tire 26. The duct 34 has an opening that communicates with hopper/valve assembly 46 that supplies the traction media. The opening preferably includes a baffle 40 capable of delivering the traction media 10 from the hopper/valve assembly 46 into the air flow 48 to provide a controlled path of traction media 10 between the upper surface 22, such as the tire 26, and a lower surface 24, such as ground 30.

A duct and/or baffle that provides the controlled path of flow can be constructed of any type of material, such as metal or plastic, having a tube type form and an approximate 90 degree angle 42 located between an intake 38 and a discharge 44. The function of an approximate 90 degree angle 42 is to appropriately redirect essentially horizontal air flow 48 vertically toward the ground 30.

Intake 38 may be ridged or flexible and may be straight or may have a bell or horn type of form and may be angled to provide a protruding edge to protect from snow or dust accumulating in the throat of intake 38. The function of intake 38 is to allow the appropriate entry of air flow 48.

Discharge 44 terminates in about a 45 degree angle, (e.g., +/−10 degrees) from vertical. The purpose of an angle is to provide a lowered edge to prevent water intrusion from ground water propelled toward the relative air movement duct 34 by the tire 50 encountering surface 46 water.

The horizontal portion of a relative air movement duct 34 measured from the center of approximate 90 degree angle 42 to the intake 38 is about 12 inches, (e.g., +/−10 percent), or in other embodiments it could be any length. The vertical portion of a relative air movement duct 34 measured from the center of approximate 90 degree angle 42 to the discharge 44 is about 7.5 inches, (e.g., +/−10 percent), or in other embodiments it could be any length.

Baffle 40 is comprised of a flat plate positioned to divert air flow 48 just in front of and below a hopper/valve assembly 46. The baffle 40 creates a negative pressure in a hopper/valve assembly 46 to protect it from intruding moisture entrained in the air flow 48. The leading edge of baffle 40 is located to be on a plane that is essentially tangent to an inner surface of the approximate 90 degree angle 42 elbow bend or about 45 degrees, (e.g., +/−10 percent). The trailing edge of baffle 40 is located approximately below the trailing edge of the opening of hopper/valve assembly 46. Baffle 40 is positioned about 135 degrees to the direction of the air flow 48. The trailing edge of baffle 40 approximately bisects the airflow 48, (e.g., +/−10 percent). A baffle 40 may be any shape such as a rectangle, square, circle, sine or parabolic curve or any free form shape. A baffle 40 may contain a curved surface.

Figure 26:
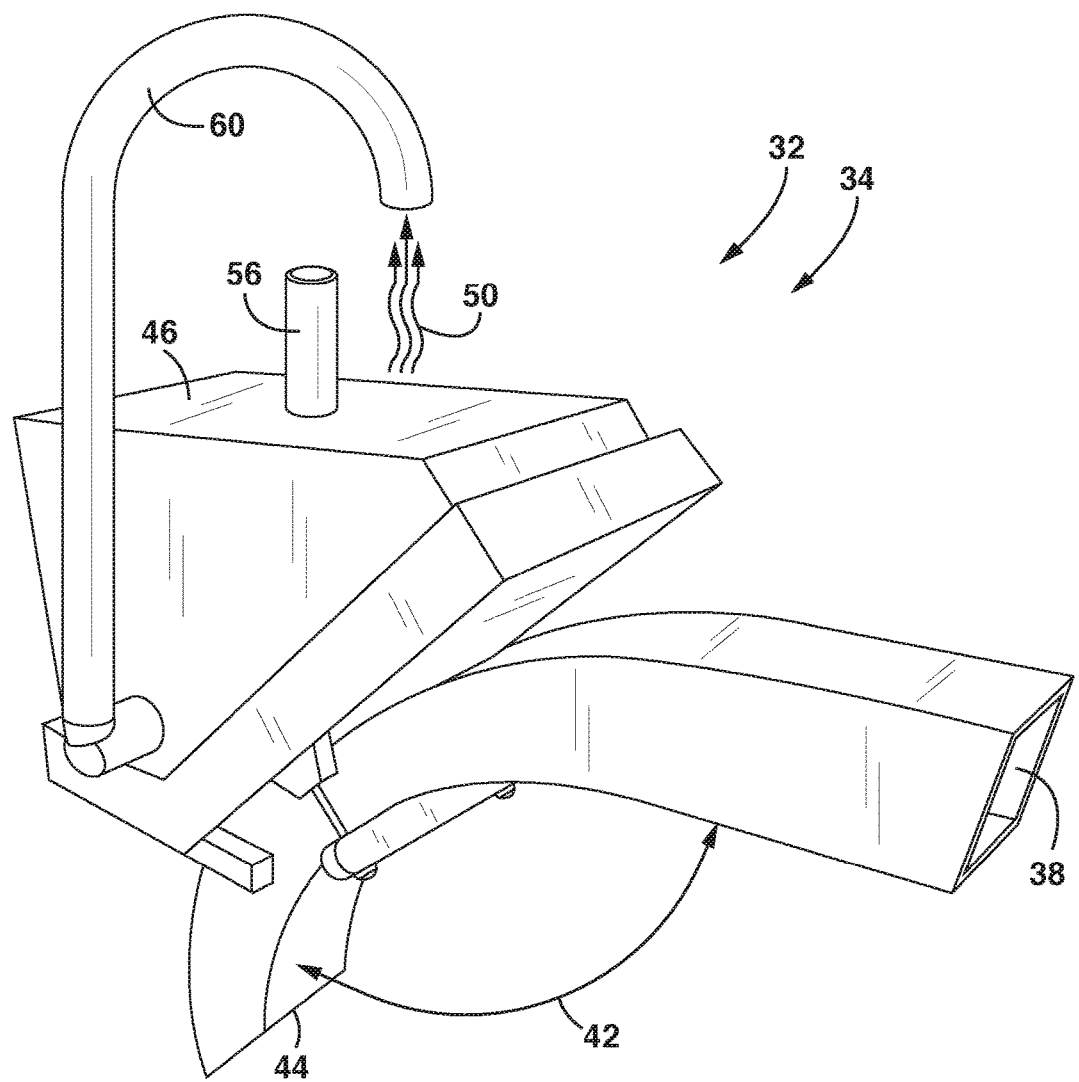
FIG. 26 is a perspective view of a of a traction media, in use, in a second embodiment of a traction enhancing system used on a motor vehicle.
Figure 27:
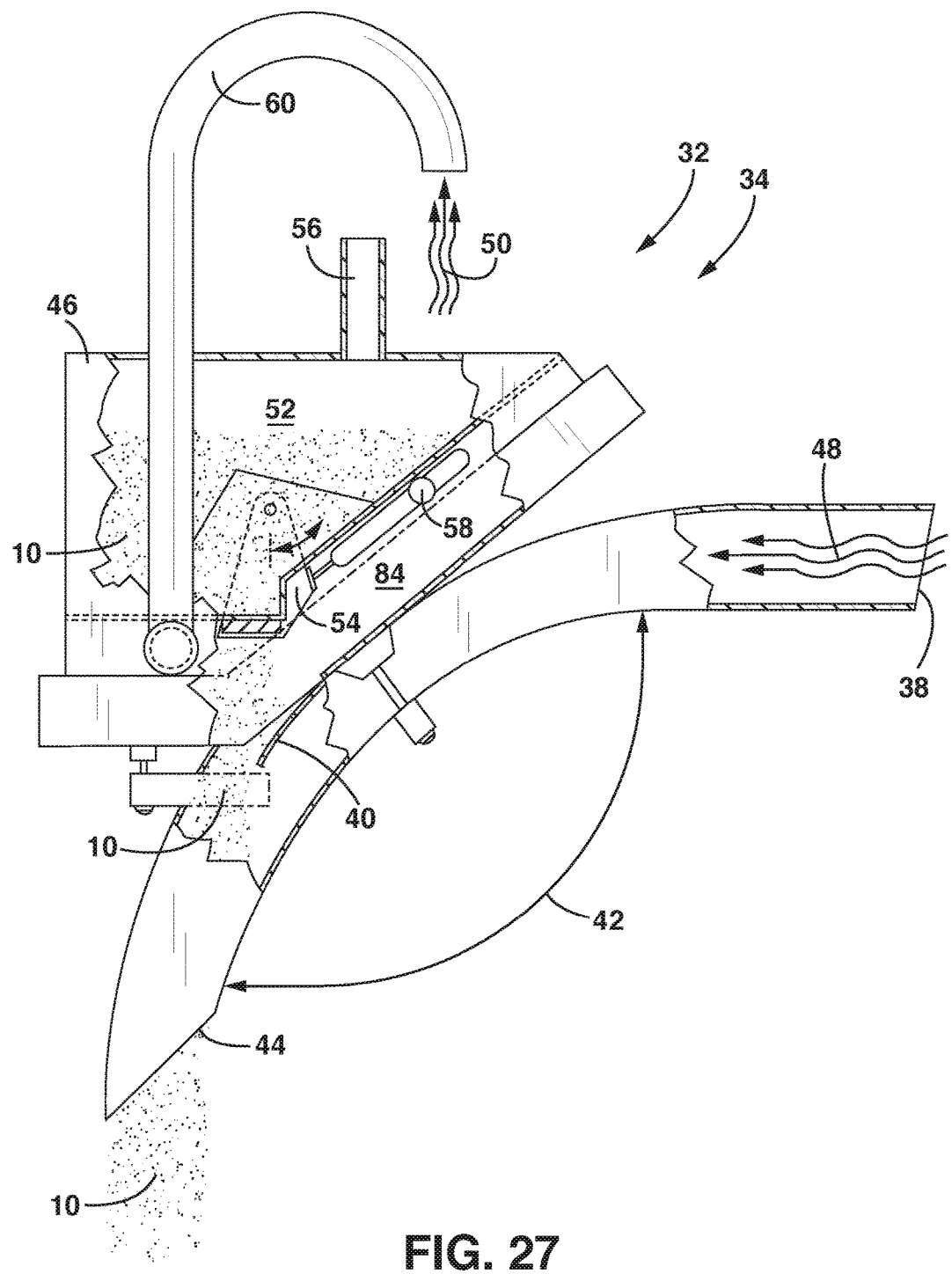
FIG. 27 is a side cut away view of FIG. 26.

Referring more particularly to the embodiment in illustrations FIG. 26 and FIG. 27, in at least one embodiment, the hopper 52 is a sealed and controlled chamber to hold traction media 10 until needing to be deployed for use. The fill port 56, that may be capped, open or of any configuration, is used to load traction media 10 into hopper 52. The actuator 58 is powered by manual or automated means to open and close the valve 54 dispensing a controlled amount of traction media 10 into air flow 48. The dry air inlet 60 draws the dry air 50 into the intermediate chamber 84 to facilitate the proper dispensing of traction media 10 prior to baffle 40 into air flow 48. A dry air inlet 60 is comprised of a tube with an upside down loop to prevent moisture from entering intermediate chamber 84. A dry air inlet 60 can be positioned anywhere in a vehicle. The dry air inlet 60 may provide heated air and/or pressurized air.

A traction media 10 can be any natural or synthetic substance having a coefficient of friction capable of producing useful results in controlling and stopping vehicles on slippery lower surfaces 24 such as ice, snow, water and other substances with a low coefficient of friction. A traction media 10 can be of a dissolvable composition that disintegrates, in a time controlled fashion, after producing its useful traction controlling function.

The above description is given as example of structure and use for domestic vehicle application. In other macro and micro embodiments the above-mentioned dimensions can vary in proportion to the application. As examples, a macro embodiment of the invention could be larger dimensions to accommodate mining trucks and super sized vehicles or smaller dimensions to accommodate micro embodiments such as drone aircraft or super small robotic controlled vehicles.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A traction enhancing system comprising:
   a hopper for storing traction media;
   a duct having an opening therein in communication with the hopper to supply traction media to the duct through an intermediate chamber, the duct further having an intake at a front end, a discharge at a rear end, and a baffle located between the front and rear ends that directs the traction media into air flow entering the front end of the duct;
   a dry air inlet coupled to the intermediate chamber that provide at least one of heated and compressed air into the intermediate chamber, and
   a valve disposed at the hopper opened to release the traction media from the hopper into the intermediate chamber therewith exposing the traction media to the at least one of heated and compressed air, wherein the baffle is located at the opening in the duct and directs airflow passing through the duct away from the opening in the duct.

2. The system of claim 1, wherein the duct redirects essentially horizontal airflow vertically toward the ground.

3. The system of claim 2, wherein the intake of the duct is about 90 degrees relative to the discharge of the duct.

4. The system of claim 1, wherein the duct has a bend therein having an inner surface and wherein the baffle is located within the duct so that the baffle is essentially tangent to the inner surface.

5. The system of claim 1, wherein the baffle has a planer structure that is located at about 135 degrees relative to a direction of airflow.

6. The system of claim 5, wherein airflow is essentially horizontal.

7. The system of claim 1, wherein the hopper comprises a valve at the opening and an actuator that controls opening and closing of the valve.

8. The system of claim 1, wherein the hopper comprises a dry air inlet in communication with an intermediate chamber within the hopper.

9. The system of claim 1, wherein the traction media comprise a body with a plurality of surfaces, the surfaces intersecting to form a plurality of vertices each having an axis extending from a common proximal end to a distal ends, the surfaces and axes configured so that when the traction media is deposited on a flat surface, planer surfaces do not come into contact with the flat surface.

10. The system of claim 1, wherein the traction media comprise a body with a plurality of surfaces, the surfaces intersecting to form a plurality of vertices each having an axis extending from a common proximal end to a distal ends, the surfaces and axes configured so that when the traction media is deposited on a flat surface, only the vertices come into contact with the flat surface.

11. The system of claim 10, wherein the traction media comprise four axes therewith forming four vertices.

12. The system of claim 11 wherein the traction media comprise six axes therewith forming four vertices.

13. The system of claim 12 wherein each of the axes is essentially perpendicular to at least four of the other axes.

14. The system of claim 12 wherein each of the axes is surrounded by three planer faces.

15. The system of claim 14, wherein the planer faces of each of the axes interest with the planer faces of at least two the axes to form a triangle.

16. The system of claim 15 wherein the triangle is an equilateral triangle.

* * * * *